United States Patent [19]
Hirahara et al.

[11] Patent Number: 4,910,603
[45] Date of Patent: Mar. 20, 1990

[54] HALF-TONE IMAGE REPRODUCTION METHOD AND APPARATUS USING PARTIAL DENSITY RANGES

[75] Inventors: Shuzo Hirahara, Yokohama; Kiyoshi Yamada, Chigasaki; Kazuhiko Higuchi, Kawasaki, all of Japan

[73] Assignee: Kabushiki Kaisha Toshiba, Kawasaki, Japan

[21] Appl. No.: 233,361

[22] Filed: Aug. 18, 1988

[30] Foreign Application Priority Data

Aug. 18, 1987 [JP] Japan .................. 62-203393
Aug. 18, 1987 [JP] Japan .................. 62-203394

[51] Int. Cl.⁴ .............................................. H04N 1/40
[52] U.S. Cl. ...................................... 358/298; 358/457
[58] Field of Search ............... 358/298, 283, 284, 455, 358/456, 457

[56] References Cited

U.S. PATENT DOCUMENTS

| | | | |
|---|---|---|---|
| 4,495,522 | 1/1985 | Matsunawa | 358/283 |
| 4,514,738 | 4/1985 | Nagato et al. | 346/76 PH |
| 4,663,662 | 5/1987 | Sekizawa et al. | 358/283 |
| 4,724,446 | 2/1988 | Hirahara et al. | 358/283 |
| 4,742,400 | 5/1988 | Tsuji | 358/283 |

FOREIGN PATENT DOCUMENTS 60-240277 11/1985 Japan .
61-30793 7/1986 Japan .

OTHER PUBLICATIONS

Proceedings of the 1st Non-Impact Printing Technologies Symposium (Society of Electrophotography of Japan), pp. 94–99; N. Kawamura et al.; Jul. 24, 1984.

*Primary Examiner*—Teresa J. Walberg
*Assistant Examiner*—Scott A. Rogers
*Attorney, Agent, or Firm*—Oblon, Spivak, McClelland, Maier & Neustadt

[57] ABSTRACT

A half-tone image reproduction apparatus, which comprises a Dither matrix memory, constituted by a plurality of elements, for storing a multi-level Dither matrix having multi threshold levels assigned to the individual elements, input data supplying means for supplying the element on the Dither matrix and an input density level, and print dot forming means for forming print dots in accordance with the energy control level selectively read out from the Dither matrix memory. The energy control level stored in the Dither matrix memory is set in accordance with rules for changing the energy control level in accordance with a change in input density level. These rules are independently suitably determined for the respective partial density ranges which constitute a whole density range for the input density. According to this invention, gradation jump and deformation at a high density region can be prevented so that a half-tone image with smooth gradation and high resolution can be attained.

40 Claims, 27 Drawing Sheets

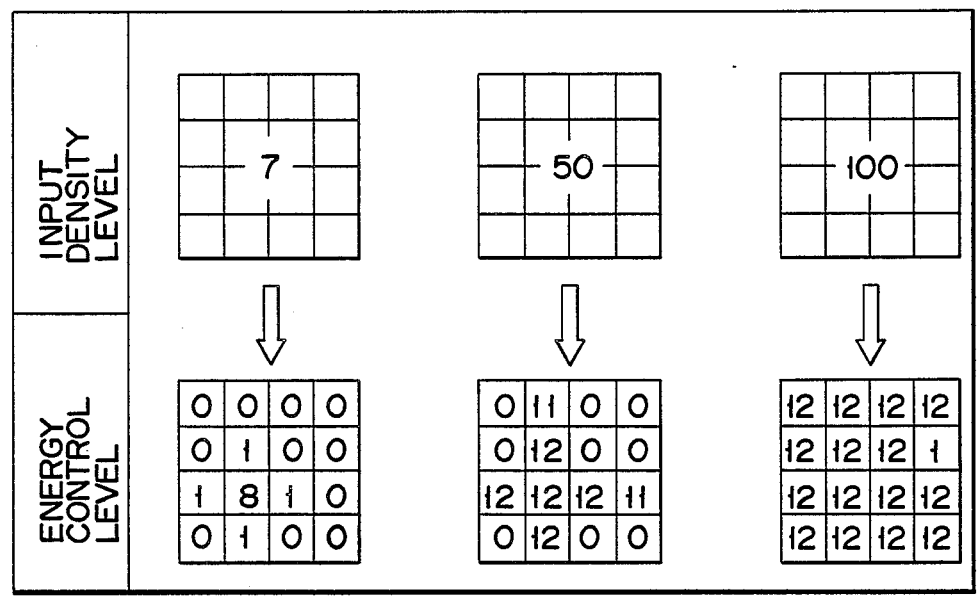
F I G. 5
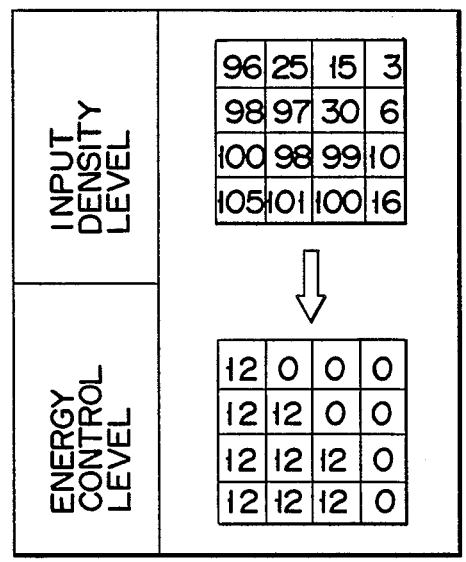
F I G. 6

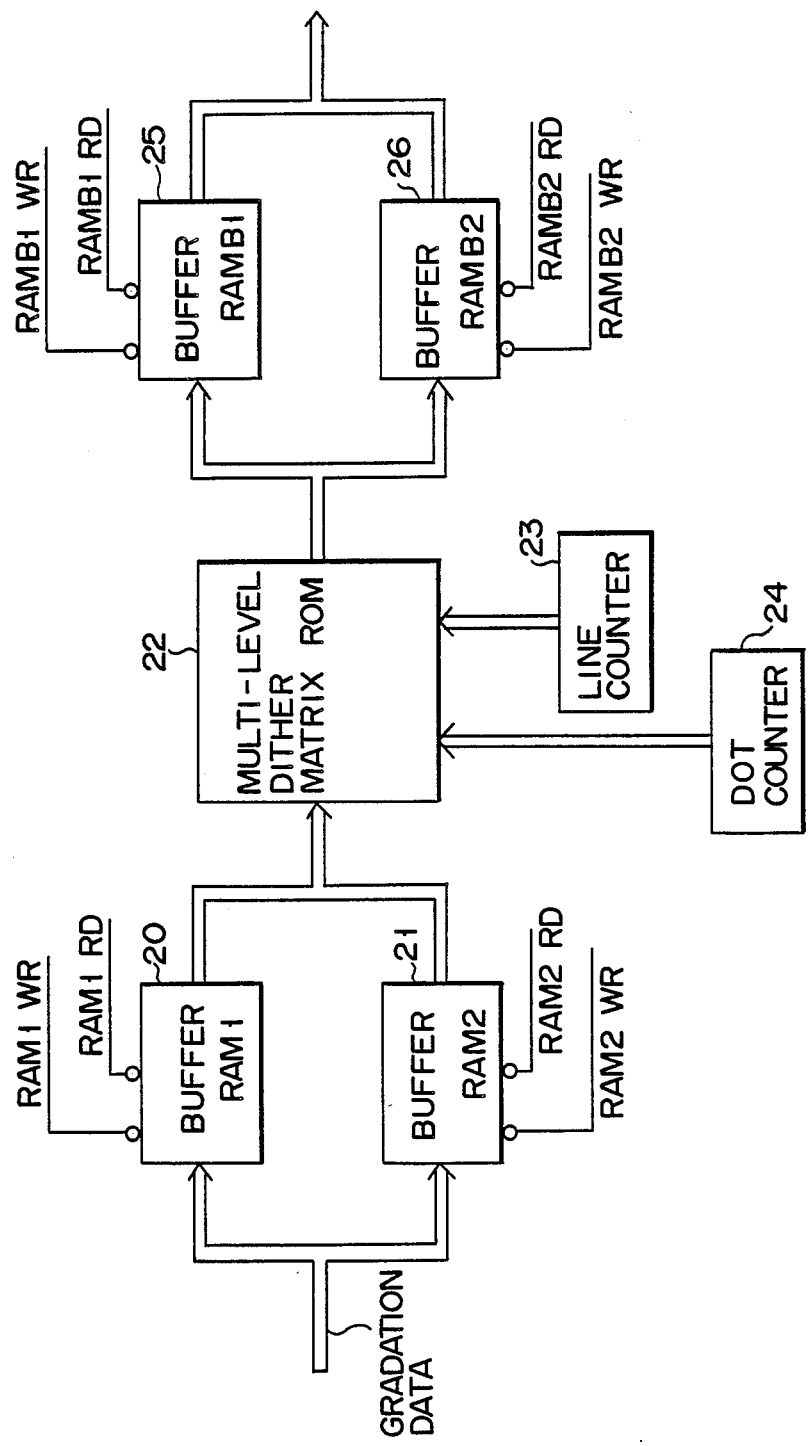
F I G. 8

| | INPUT DENSITY LEVEL | ELEMENTS COORDINATES | | | |
|---|---|---|---|---|---|
| | | Y: 0 — X: 0 1 2 3 | Y: 1 — X: 0 1 2 3 | Y: 2 — X: 0 1 2 3 | Y: 3 — X: 0 1 2 3 |
| TYPE (1) | 0 | 0 0 0 0 | 0 0 0 0 | 0 0 0 0 | 0 0 0 0 |
| | 1 | | 0 1 0 0 | 1 2 1 0 | 0 1 0 0 |
| | 2 | | | 1 3 1 0 | |
| | 3 | | | 1 4 1 0 | |
| | 4 | | | 1 5 1 0 | |
| | 5 | | | 1 6 1 0 | |
| | 6 | | | 1 7 1 0 | |
| | 7 | | 0 1 0 0 | 1 8 1 0 | |
| | 8 | | 0 2 0 0 | | |
| | 9 | | 0 3 0 0 | | |
| | 10 | | 0 4 0 0 | | |
| | 11 | | 0 5 0 0 | | |
| | 12 | | 0 6 0 0 | | |
| | 13 | | 0 7 0 0 | | |
| | 14 | | 0 8 0 0 | 1 8 1 0 | |
| | 15 | | | 1 8 2 0 | |
| | 16 | | | 1 8 3 0 | |
| | 17 | | | 1 8 4 0 | |
| | 18 | | | 1 8 5 0 | |
| | 19 | | | 1 8 6 0 | |
| TYPE (2) | 20 | | | 1 8 7 0 | |
| | 21 | | | 1 8 8 0 | |
| | 22 | | | 2 8 8 0 | |
| | 23 | | | 3 8 8 0 | |
| | 24 | | | 4 8 8 0 | |
| | 25 | | | 5 8 8 0 | |
| | 26 | | | 6 8 8 0 | |
| | 27 | | | 7 8 8 0 | |
| | 28 | | | 8 8 8 0 | 0 1 0 0 |
| | 29 | 0 0 0 0 | 0 8 0 0 | 8 8 8 0 | 0 2 0 0 |

F I G. 10A

| INPUT DENSITY LEVEL | ELEMENTS COORDINATES ||||||||||||||||
|---|---|---|---|---|---|---|---|---|---|---|---|---|---|---|---|---|
| | 0 |||| 1 |||| 2 |||| 3 ||||
| | 0 | 1 | 2 | 3 | 0 | 1 | 2 | 3 | 0 | 1 | 2 | 3 | 0 | 1 | 2 | 3 |
| TYPE (2) ||||||||||||||||| 
| 30 | 0 | 0 | 0 | 0 | 0 | 8 | 0 | 0 | 8 | 8 | 8 | 0 | 0 | 3 | 0 | 0 |
| 31 | | | | | | | | | | | | | 0 | 4 | 0 | 0 |
| 32 | | | | | | | | | | | | | 0 | 5 | 0 | 0 |
| 33 | | | | | | | | | | | | | 0 | 6 | 0 | 0 |
| 34 | | | | | | | | | | | | | 0 | 7 | 0 | 0 |
| 35 | | | | | 0 | 8 | 0 | 0 | 8 | 8 | 8 | 0 | 0 | 8 | 0 | 0 |
| TYPE (3) |||||||||||||||||
| 36 | | | | | 0 | 9 | 0 | 0 | 9 | 9 | 9 | 0 | 0 | 9 | 0 | 0 |
| 37 | | | | | 0 | 10 | 0 | 0 | 10 | 10 | 10 | 0 | 0 | 10 | 0 | 0 |
| 38 | | | | | 0 | 11 | 0 | 0 | 11 | 11 | 11 | 0 | 0 | 11 | 0 | 0 |
| 39 | 0 | 0 | 0 | 0 | 0 | 12 | 0 | 0 | 12 | 12 | 12 | 0 | 0 | 12 | 0 | 0 |
| 40 | 0 | 1 | 0 | 0 | | | | | 12 | 12 | 12 | 1 | | | | |
| 41 | 0 | 2 | 0 | 0 | | | | | 12 | 12 | 12 | 2 | | | | |
| 42 | 0 | 3 | 0 | 0 | | | | | 12 | 12 | 12 | 3 | | | | |
| 43 | 0 | 4 | 0 | 0 | | | | | 12 | 12 | 12 | 4 | | | | |
| 44 | 0 | 5 | 0 | 0 | | | | | 12 | 12 | 12 | 5 | | | | |
| 45 | 0 | 6 | 0 | 0 | | | | | 12 | 12 | 12 | 6 | | | | |
| 46 | 0 | 7 | 0 | 0 | | | | | 12 | 12 | 12 | 7 | | | | |
| 47 | 0 | 8 | 0 | 0 | | | | | 12 | 12 | 12 | 8 | | | | |
| 48 | 0 | 9 | 0 | 0 | | | | | 12 | 12 | 12 | 9 | | | | |
| 49 | 0 | 10 | 0 | 0 | | | | | 12 | 12 | 12 | 10 | | | | |
| 50 | 0 | 11 | 0 | 0 | | | | | 12 | 12 | 12 | 11 | | | | |
| TYPE (4) |||||||||||||||||
| 51 | 0 | 12 | 0 | 0 | 0 | 12 | 0 | 0 | 12 | 12 | 12 | 12 | 0 | 12 | 0 | 0 |
| 52 | | | | | 1 | 12 | 1 | 0 | | | | | 1 | 12 | 1 | 0 |
| 53 | | | | | 2 | 12 | 2 | 0 | | | | | 2 | 12 | 2 | 0 |
| 54 | | | | | 3 | 12 | 3 | 0 | | | | | 3 | 12 | 3 | 0 |
| 55 | | | | | 4 | 12 | 4 | 0 | | | | | 4 | 12 | 4 | 0 |
| 56 | | | | | 5 | 12 | 5 | 0 | | | | | 5 | 12 | 5 | 0 |
| 57 | | | | | 6 | 12 | 6 | 0 | | | | | 6 | 12 | 6 | 0 |
| 58 | | | | | 7 | 12 | 7 | 0 | | | | | 7 | 12 | 7 | 0 |
| 59 | 0 | 12 | 0 | 0 | 8 | 12 | 8 | 0 | 12 | 12 | 12 | 12 | 8 | 12 | 8 | 0 |

F I G. 10B

| INPUT DENSITY LEVEL | ELEMENTS COORDINATES ||||||||||||||||
| --- | --- | --- | --- | --- | --- | --- | --- | --- | --- | --- | --- | --- | --- | --- | --- | --- |
| | 0 |||| 1 |||| 2 |||| 3 ||||
| | 0 | 1 | 2 | 3 | 0 | 1 | 2 | 3 | 0 | 1 | 2 | 3 | 0 | 1 | 2 | 3 |
| 60 | 0 | 12 | 0 | 0 | 9 | 12 | 9 | 0 | 12 | 12 | 12 | 12 | 9 | 12 | 9 | 0 |
| 61 | | | | | 10 | 12 | 10 | 0 | | | | | 10 | 12 | 10 | 0 |
| 62 | | | | | 11 | 12 | 11 | 0 | | | | | 11 | 12 | 11 | 0 |
| 63 | 0 | 12 | 0 | 0 | 12 | 12 | 12 | 0 | | | | | 12 | 12 | 12 | 0 |
| 64 | 1 | 12 | 1 | 0 | | | | | | | | | | | | |
| 65 | 2 | 12 | 2 | 0 | | | | | | | | | | | | |
| 66 | 3 | 12 | 3 | 0 | | | | | | | | | | | | |
| 67 | 4 | 12 | 4 | 0 | | | | | | | | | | | | |
| 68 | 5 | 12 | 5 | 0 | | | | | | | | | | | | |
| 69 | 6 | 12 | 6 | 0 | | | | | | | | | | | | |
| 70 | 7 | 12 | 7 | 0 | | | | | | | | | | | | |
| 71 | 8 | 12 | 8 | 0 | | | | | | | | | | | | |
| 72 | 9 | 12 | 9 | 0 | | | | | | | | | | | | |
| 73 | 10 | 12 | 10 | 0 | | | | | | | | | | | | |
| 74 | 11 | 12 | 11 | 0 | | | | | | | | | | | | |
| 75 | 12 | 12 | 12 | 0 | | | | | | | | | 12 | 12 | 12 | 0 |
| 76 | | | | | | | | | | | | | 12 | 12 | 12 | 1 |
| 77 | | | | | | | | | | | | | 12 | 12 | 12 | 2 |
| 78 | | | | | | | | | | | | | 12 | 12 | 12 | 3 |
| 79 | | | | | | | | | | | | | 12 | 12 | 12 | 4 |
| 80 | | | | | | | | | | | | | 12 | 12 | 12 | 5 |
| 81 | | | | | | | | | | | | | 12 | 12 | 12 | 6 |
| 82 | | | | | | | | | | | | | 12 | 12 | 12 | 7 |
| 83 | | | | | | | | | | | | | 12 | 12 | 12 | 8 |
| 84 | | | | | | | | | | | | | 12 | 12 | 12 | 9 |
| 85 | | | | | | | | | | | | | 12 | 12 | 12 | 10 |
| 86 | | | | | | | | | | | | | 12 | 12 | 12 | 11 |
| 87 | 12 | 12 | 12 | 0 | | | | | | | | | 12 | 12 | 12 | 12 |
| 88 | 12 | 12 | 12 | 1 | | | | | | | | | | | | |
| 89 | 12 | 12 | 12 | 2 | 12 | 12 | 12 | 0 | 12 | 12 | 12 | 12 | 12 | 12 | 12 | 12 |

TYPE (4): rows 60–74
TYPE (6): rows 75–89

F I G. 10C

| INPUT DENSITY LEVEL | ELEMENTS COORDINATES ||||||||||||||||
|---|---|---|---|---|---|---|---|---|---|---|---|---|---|---|---|---|
| | 0 |||| 1 |||| 2 |||| 3 ||||
| | 0 | 1 | 2 | 3 | 0 | 1 | 2 | 3 | 0 | 1 | 2 | 3 | 0 | 1 | 2 | 3 |
| 90 | 12 | 12 | 12 | 3 | 12 | 12 | 12 | 0 | 12 | 12 | 12 | 12 | 12 | 12 | 12 | 12 |
| 91 | 12 | 12 | 12 | 4 | | | | | | | | | | | | |
| 92 | 12 | 12 | 12 | 5 | | | | | | | | | | | | |
| 93 | 12 | 12 | 12 | 6 | | | | | | | | | | | | |
| 94 | 12 | 12 | 12 | 7 | | | | | | | | | | | | |
| 95 | 12 | 12 | 12 | 8 | | | | | | | | | | | | |
| 96 | 12 | 12 | 12 | 9 | | | | | | | | | | | | |
| 97 | 12 | 12 | 12 | 10 | | | | | | | | | | | | |
| 98 | 12 | 12 | 12 | 11 | | | | | | | | | | | | |
| 99 | 12 | 12 | 12 | 12 | 12 | 12 | 12 | 0 | | | | | | | | |
| 100 | | | | | 12 | 12 | 12 | 1 | | | | | | | | |
| 101 | | | | | 12 | 12 | 12 | 2 | | | | | | | | |
| 102 | | | | | 12 | 12 | 12 | 3 | | | | | | | | |
| 103 | | | | | 12 | 12 | 12 | 4 | | | | | | | | |
| 104 | | | | | 12 | 12 | 12 | 5 | | | | | | | | |
| 105 | | | | | 12 | 12 | 12 | 6 | | | | | | | | |
| 106 | | | | | 12 | 12 | 12 | 7 | | | | | | | | |
| 107 | | | | | 12 | 12 | 12 | 8 | | | | | | | | |
| 108 | | | | | 12 | 12 | 12 | 9 | | | | | | | | |
| 109 | | | | | 12 | 12 | 12 | 10 | | | | | | | | |
| 110 | | | | | 12 | 12 | 12 | 11 | | | | | | | | |
| 111 | 12 | 12 | 12 | 12 | 12 | 12 | 12 | 12 | 12 | 12 | 12 | 12 | 12 | 12 | 12 | 12 |

TYPE (6)

F I G. 10D

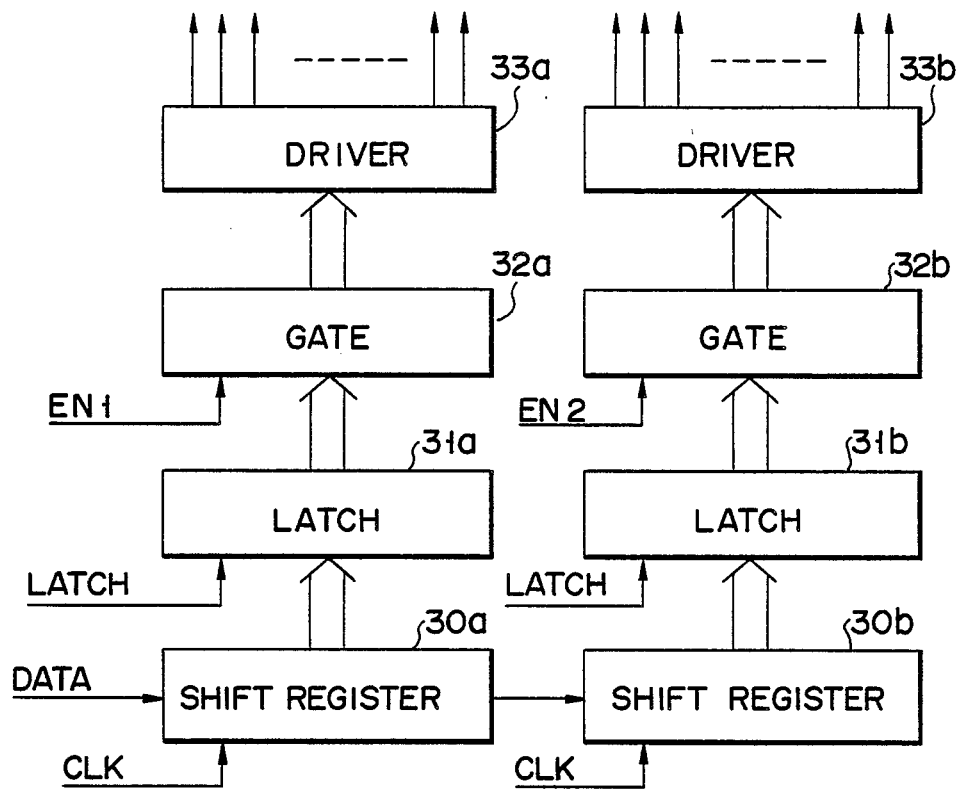
F I G. 11

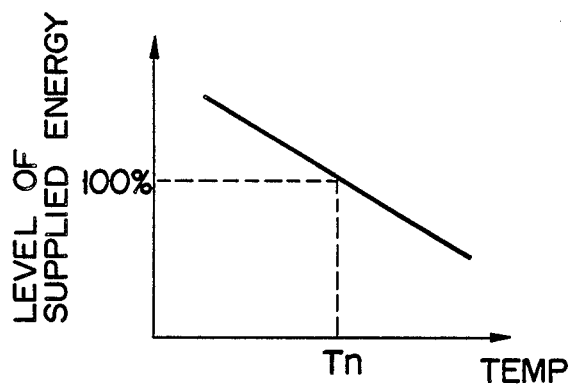
F I G. 13
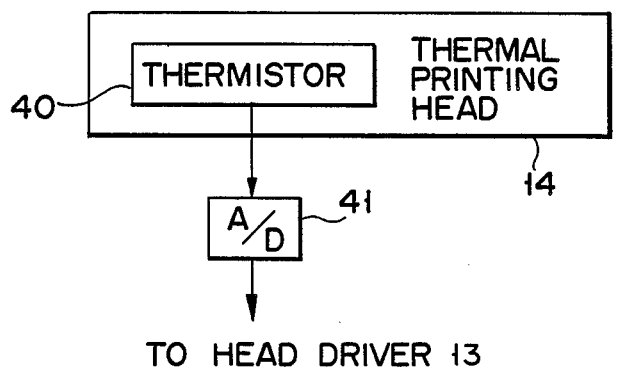
F I G. 14

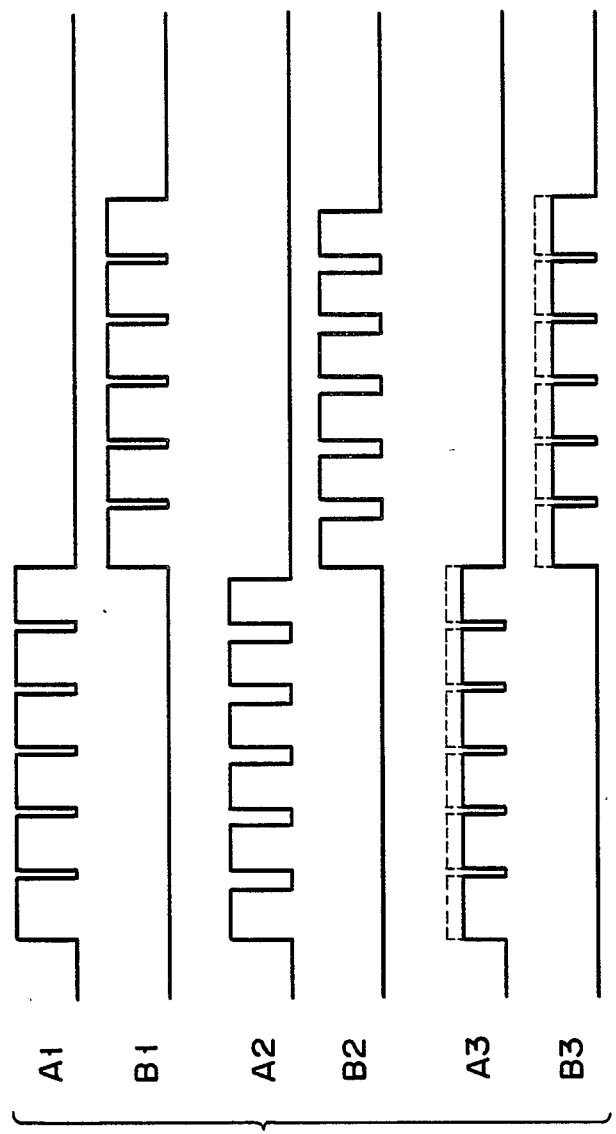
F I G. 15

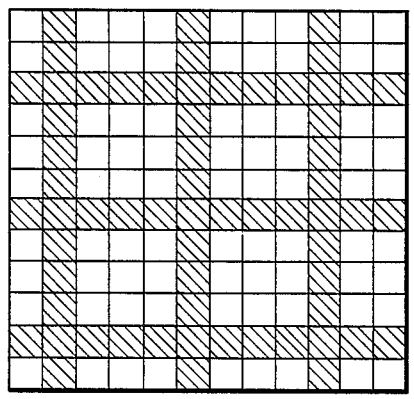
F I G. 20
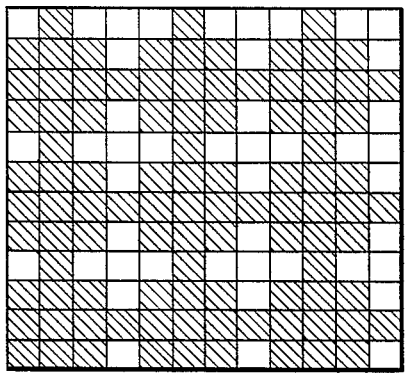
F I G. 21

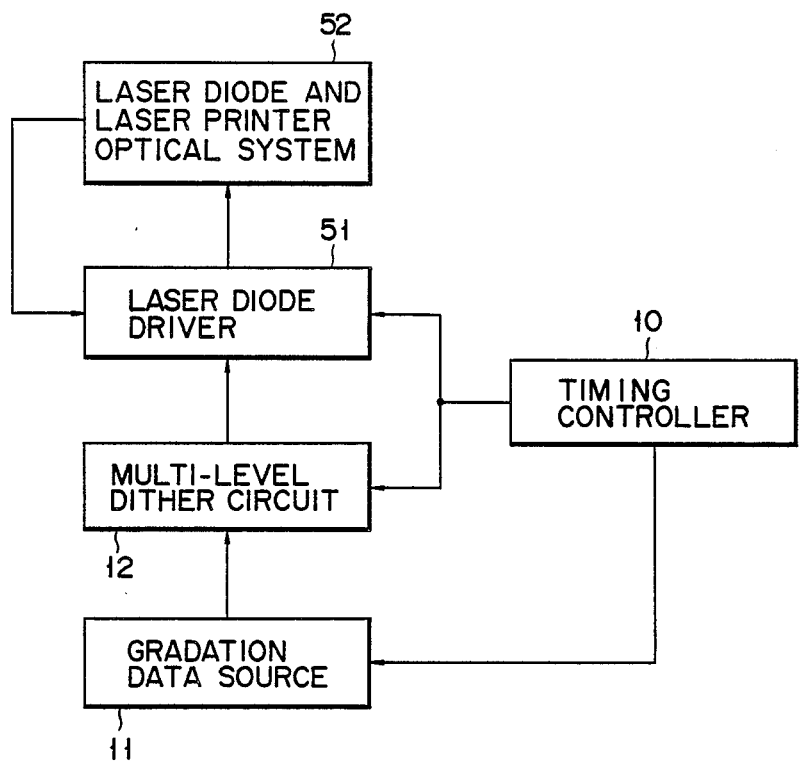
F I G. 27

HALF-TONE IMAGE REPRODUCTION METHOD AND APPARATUS USING PARTIAL DENSITY RANGES

BACKGROUND OF THE INVENTION

1. Field of the Invention

The present invention relates to a half-tone reproduction method and a half-tone reproduction apparatus for reproducing a half-tone image with a thermal printer and other printers, and, more particularly, to a half-tone reproduction method and a half-tone reproduction apparatus for reproducing a half-tone image using a multi-level Dither matrix.

2. Description of the Related Art

A Dither method and fixed pattern method are known as methods which reproduce a pseudo half-tone using a recording device, such as a thermal printer or a laser beam printer, suitable for reproduction of a binary image. Of these, the Dither method is often used as a system for expressing a pseudo half-tone since it can provide a fine gradation reproduction of an image part with s smooth density change without degrading the resolution of an image part with a relatively sharp density change. According to the Dither method, an input density level is compared with each threshold level of a Dither matrix, and when the input density level is greater than the threshold level, dots are formed, and when it is smaller, no dots are formed. Therefore, the gradation of a image with a smooth change in density level is expressed by the overall matrix by modulating the number of recording dots (density) within the matrix, while an edge part of an image with a sharp change in density level is finely reproduced at the level of each dot in the matrix. Since the Dither method provides fine reproduction of a smooth change in density, the greater the number of gradations, the greater the matrix, thus reducing the resolution accordingly; on the other hand, the smaller the matrix, the higher the resolution with reduction in the number of gradations.

Another type of Dither method is known that utilizes a threshold-level matrix in which multi-levels are assigned to a single dot in order to express a large number of gradations with a small matrix. (This particular method will be hereinafter called a multi-level Dither method, and is disclosed in Japanese Patent Disclosure 61-30793.) This Japanese document discloses the following two rules for varying the energy control level with a change in input density level. The first rule is such that the level of only a specific dot is varied, and when it reaches the lowest or highest level, then a dot to be varied is changed to another one. The other one is such that the levels of the individual dots within the matrix are varied so that their overall levels become even. As example of the latter rule applied particularly to a lesser beam printer, a four-level Dither method has been reported by Kawamura et al. in Proceedings of Non-impact Printing Technologies Symposium, 4-5, p. 94-99, 1984 July 24. Another Japanese Patent Disclosure 60-240277 discloses a different rule than the mentioned two, which involves a mixture of dots whose control levels increase and those whose control levels decrease at the time the density level is changed.

However, such conventional multi-level Dither methods would occur gradation jumping or deformation an image at a high density region, and thus would not provide a fine gradation expression, nor would they improve the resolution, to the expected level.

This problem will be explained below with reference to thermal transfer recording. As the amount of supplied energy to an isolated pattern consisting of a single dot is gradually varied, the amount of ink to be transferred onto a recording sheet almost monotonously increases. After ink transfer for one dot is completed, such monotonous increase is established. At a level where isolated dots are no yet formed, however, the uncertainty as to whether or not the isolated dots will be transferred would cause instability. In the case where isolated dots are formed adjacent to one another, there would be an unstable region formed between the dots by the coupling or separation of the dots. Further, in a high density region, that part which should be in white may be smeared in black, resulting in the instability too.

From the above, it should be understood that there exist some instabilities in the relationship between the input energy of the individual heat generating elements and the print density between low and high density regions. Such instabilities could cause gradation jumping or deformation at a high density region, thus deteriorating the quality of an attained image.

SUMMARY OF THE INVENTION

It is an object of this invention to provide a half-tone reproduction system, which uses a multi-level Dither method, cause no gradation dump so as to ensure smooth gradation expression, and provide a printed image with a high resolution.

To achieve this object, there is provided a half-tone reproduction method comprising the steps of:

storing a Dither matrix consisting of M (M being an integer greater than or equal to 2) elements for expressing a pseudo half-tone image as a whole, each element of said Dither matrix having an information representing the relation between an input density level and an energy control level, said energy control level for each element being determined by N (N being an integer greater than or equal to 2) different threshold levels with respect to the input density level, a whole density range for the input density level being divided into a plurality of partial density range, and the energy control level for each element being set in accordance with different rules, each rule providing an independent and suitable change in energy control level with a change in input density level for each of a plurality of the partial density ranges;

selecting the energy control level by specifying the element on the Dither matrix and the input density level; and forming a recording dot in accordance with the energy control level.

BRIEF DESCRIPTION OF THE DRAWINGS

FIGS. 2 through 15 are diagrams for explaining a thermal printer according to one embodiment of this invention, wherein:

FIG. 2 is a diagram illustrating the relationship between a print density and different types of an energy changing rule as applied in the individual partial ranges of the energy control range, FIG. 3 is a diagram for explaining the individual energy changing rules, FIG. 4 is a diagram illustrating threshold level matrices as set based on the energy changing rules, FIG. 5 is a diagram illustrating the input versus output relationship in a case where an image with a smooth change in density is input using the threshold level matrices, FIG. 6 is a diagram illustrating the input versus output relationship in a case where an image with a sharp change in density is input using the threshold level matrices, FIG. 7 is a block diagram illustrating the arrangement of the thermal printer, FIG. 8 is block diagram illustrating a multi-level Dither circuit shown in FIG. 7, FIG. 9 is a timing chart of the multi-level Dither circuit, FIGS. 10A to 10D are diagrams illustrating the contents of a multi-level Dither matrix ROM shown in FIG. 8, FIG. 11 is a block diagram of a head driver shown in FIG. 7, FIG. 12 is a timing chart for the head driver, FIG. 13 is a diagram illustrating the relationship between the temperature of a thermal printing head shown in FIG. 7 and the level of supplied energy, FIG. 14 is a block diagram of the thermal printing head, and FIG. 15 is a diagram illustrating the waveform of a drive pulse of the thermal printing head;

FIGS. 17 through 22 are diagrams for explaining a thermal printer according to a different embodiment of this invention, wherein:

FIG. 17 is a diagram illustrating the relationship between a print density and a pattern as applied in the individual partial ranges of the energy control range, FIG. 18 is a diagram illustrating threshold level matrices for attaining the pattern, FIG. 19 is a diagram illustrating the input versus output relationship in a case where an image with a smooth change in density is input using the threshold level matrices, FIGS. 20 and 21 are diagrams illustrating output patterns in a case the density change of an image is smooth, and FIG. 22 is a diagram illustrating the input versus output relationship in a case where an image with a sharp change in density is input using the threshold level matrices;

FIG. 25 is a diagram illustrating the contents of a multi-level Dither matrix ROM for realizing a Dither process based on the above threshold level matrices;

FIG. 26 is a diagram illustrating improved contents of the ROM; and

FIG. 27 is a block diagram illustrating a laser beam printer embodying this invention.

DETAILED DESCRIPTION OF THE PREFERRED EMBODIMENTS

Figure 1:
FIG. 1 is a diagram exemplifying energy control level changing rules as used in this invention.

FIG. 1 exemplifies six types of a level changing rule that defines how an energy control level for forming print dots varies with a change in input density level of an original image. The numerals in the illustrated matrices represent the energy control levels for forming the individual dots. The nearer the matrices to the right in FIG. 1, the higher density level they reproduce.

TYPE 1: With energy of a constant low level (level "1" in FIG. 1) being supplied around a specific dot of a dot pattern (for example, the center dot of a cross-shaped dot pattern in FIG. 1), increasing an input density increases the supplied energy to the specific dot accordingly. Using this rule at a low density region, a constant low level energy is supplied around a dot to be printed, thus smoothening the thermal distribution for a thermal printer or the electrostatic distribution for an optical printer. This can form a small stable dot with less variation.

TYPE 2: Energy with a constant low level (for example, level "1") is supplied around a specific dot in a dot pattern as per the Type 1. Increasing an input density increases the energy control level of one of dots around the specific dot from the initial level (level "1") to a higher level (for example, level "3"). When the input density level is further increased, another one of the surrounding dots is selected and its energy control level is increased as per the above case. In this manner, the dot which is the target for a change in energy control level is sequentially shifted.

TYPE 3: The energy control levels of the individual dots constituting a dot pattern (a cross-dot pattern in FIG. 1) in a matrix are evenly varied. With this rule used in an intermediate density region, the levels of a plurality of dots are evenly increased, thus preventing specific dots from being coupled together or separated from each other due to the otherwise possible energy concentration to the specific dots. This can provide smooth gradation.

TYPE 4: The energy control levels of only two or more specific dots in a dot pattern are changed, and when they reach the lowest or highest level, the target dots for level change are sequentially changed to another group of dots.

TYPE 5: This type involves a mixture of dots whose energy control levels are increased, and the ones whose energy control levels are decreased, at the time of changing their density levels.

TYPE 6: The level of only one specific dot among those in a matrix as used in pinting is changed, and when it reaches the lowest or highest level, the target dot for level change is sequentially changed to another one. That is, Type 6 is the same as Type 4 except that Type 6 involves only one target dot at a time whose energy control level is to be changed. With this type of rule used at a high density region, the phenomenon that dots which should be printed in white would be smeared in black, can be suppressed until the density levels of dots reach a relatively high level. Accordingly, the smearing phenomenon would occur only at those regions which are not practically prominently noticeable.

The results of the experiments conducted by the present inventors show that, as compared with the case where the same level changing rule is applied to the entire density range, the present case where the entire density range is divided into a plurality of partial ranges and the level changing rules suitable for the respective partial ranges are applied thereto has a higher reproducibility of a half-tone image. The following explains an example of applying those rules to an actual half-tone image reproduction apparatus, referring to the accompanying drawings.

Figure 2:
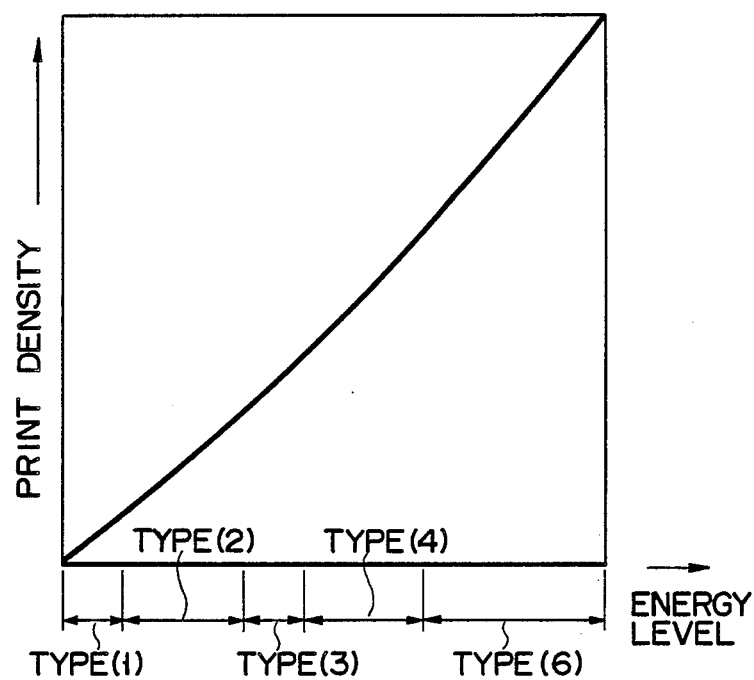

FIGS. 2-15 illustrate an embodiment in which this invention is applied to a thermal printer. As shown in FIG. 2, according to this apparatus, the energy level range is divided into five partial ranges to which the aforementioned Types 1, 2, 3, 4 and 6 are respectively applied. The energy changing rules for the individual types are realized by a 4×4 matrix as shown in FIG. 3.

Figure 3:
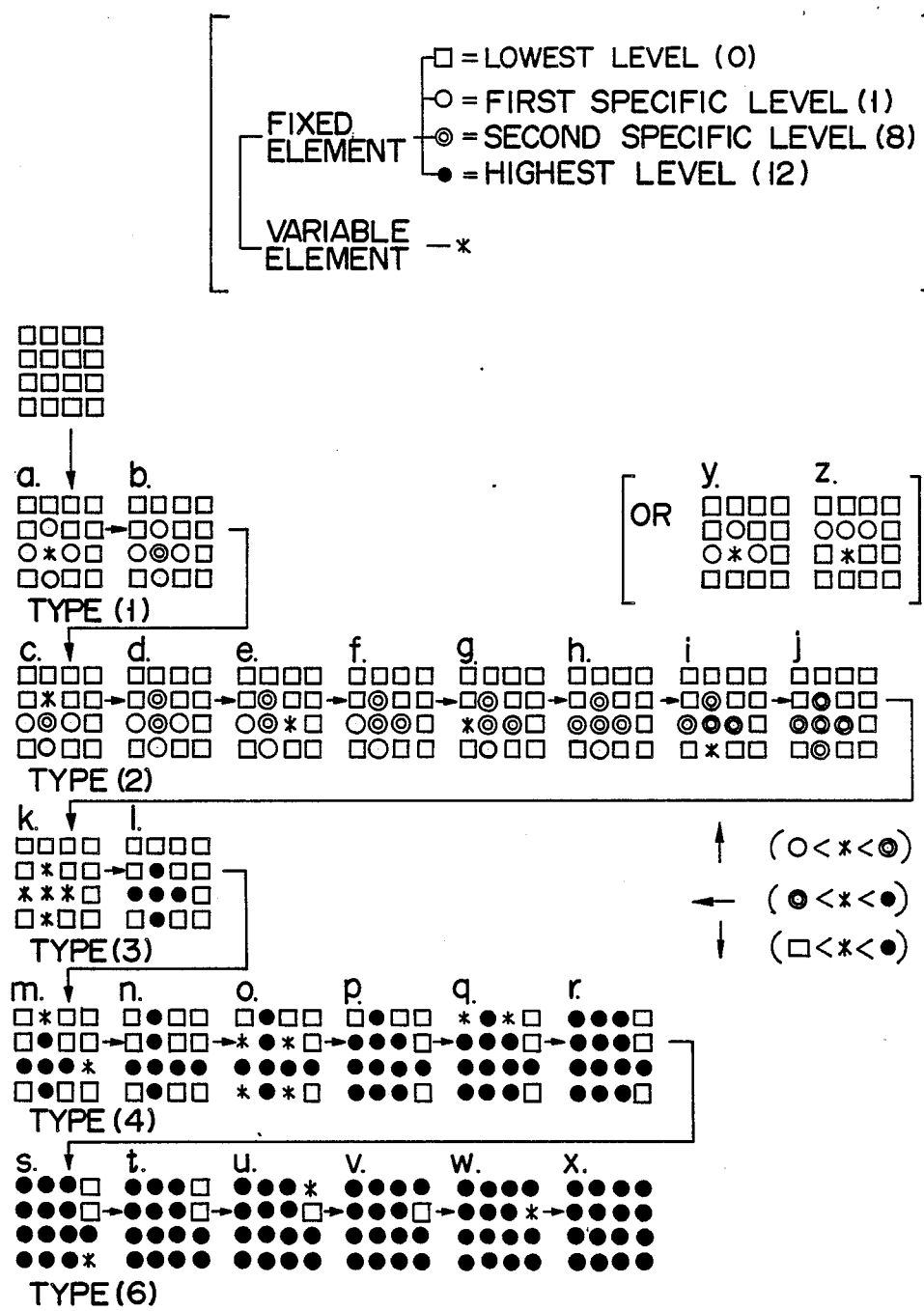

In FIG. 3, the energy levels of the individual elements constituting each matrix are each selected from 13 numerals, i.e., level "0" to level "12". The marks "□", " ○ ", " ◉ ", " ● " and "*" given to the elements respectively represent the lowest level (level "0"), the first specific level (level "1"), the second specific level (level "8"), the highest level (level "12") and a variable control level. The mark "*" in patterns a to j (Types 1 and 2) for a low density region varies within a range ○ <*< ◉ (2-7), mark "*" in patterns k and l (Type 3) for an intermediate density region varies within a range ◉ *< ● (9-11), and mark "*" in patterns m to x (Types 4 and 6) for a high density region varies within a range □<*< ● (1-11).

Patterns a and b for a low density region correspond to Type 1. For these patterns, with four surrounding dots, supplied with energy of level "1" ( ○ ), being used as the base, the level control is executed in such a way that the target dot is supplied with energy (*) higher than level "1" ( ○ ). The use of such patterns provide small stale dots with less variation and a high quality image with less gradation jump and roughness. Therefore, Type 1 is very effective in a low density region. For thermal transfer, since the thermal influence is asymmetric, patterns y and z in FIG. 3 may also be used.

Patterns c-j also for a low density region correspond to Type 2, the energy levels of the four dots used as the base i the previous case for the low density region are sequentially increased to level "8" one dot at a time in such a way that when the level of one dot reaches level "8" (◉), the level of the next one dot is increased from level "1" and so forth until the levels of all the five dots reach level "8" (◉).

Patterns k and l for an intermediate density region correspond to Type 3. For these patterns, the levels of all of the five dots which have reached to level "8" (◉) in the previous low density range are evenly increased one level at a time until the levels of the five dots reach level "12" ( ● ). This level control can smoothly vary the gradation without causing the unbalanced coupling or bridging of dots in the intermediate density region to specific sections.

Patterns m-r also for an intermediate density region correspond to Type 4. Here, the levels of a plurality of dots with level "0" (□), other those five dots which have reached level "12" ( ● ), are evenly increased.

Patterns s-x for a high density region correspond to Type 6. Here, the level of one dot with level "0" (□) other than those which have reached to level "12" ( ● ) in the previous density range is increased, and when it reaches level "12" ( ● ), the level of another one dot with level "0" (□) is increased. This level increase is repeated until the levels of the whole dots reach level "12" ( ● ). Type 6, used in a high density range, is very effective to reduce gradation jump (deformation) or roughness, but it may also be effective in an intermediate density region.

Figure 4:
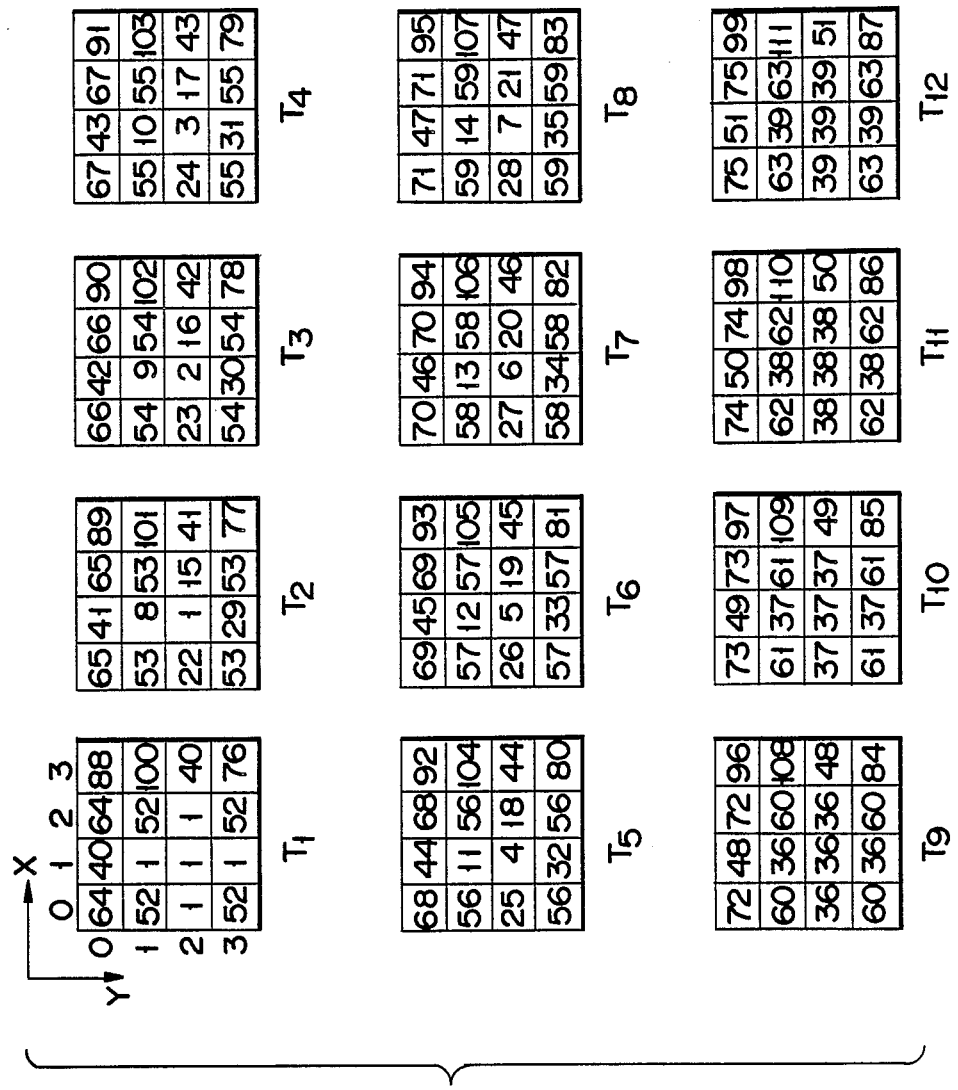

FIG. 4 illustrates a group of matrices T1-T12 which are set according to the aforementioned energy control level changing rules. Each of matrices T1-T12 is constituted by elements of threshold levels which are conditions for giving the energy control levels represented by the numerals. Ti (x, y) indicates the threshold level elements constituting each matrix using their coordinates (x, y) (x, y=0, 1, 2, 3). For instance, when the density levels are all "7", as shown in FIG. 5, this level is greater than the threshold levels of T1 (1, 1), T1 (0, 2), T1 (2, 2) and T1 (1, 3) and equals the threshold level T8 (1, 2). In this case, elements (1, 2) is set with energy control level "8", while elements (1, 1), (0, 2), (2, 2) and (1, 3) are set with energy control level "1", the other elements being set with level "0". Similarly, when the density levels are all "50", this level is greater than the threshold levels of T12 (1, 1), T12 (1, 2), T12 (1, 3), T12 (2, 0) and T12 (2, 2) and equals the threshold levels T11 (1, 0) and T11 (3, 2). Therefore, elements (1, 1) to (1, 3), (0, 2) and (2, 2) are set with energy control level "12", elements (1, 0) and (3, 2) with energy control level "11", and the other elements with level "0". It should be readily understood that the energy control levels for the density level "100" are set as shown in FIG. 5. The feature in the Dither process lies in that, as shown in FIG. 6, even if an image with a sharp density change is inputted, edge information can be well reproduced.

Figure 7:
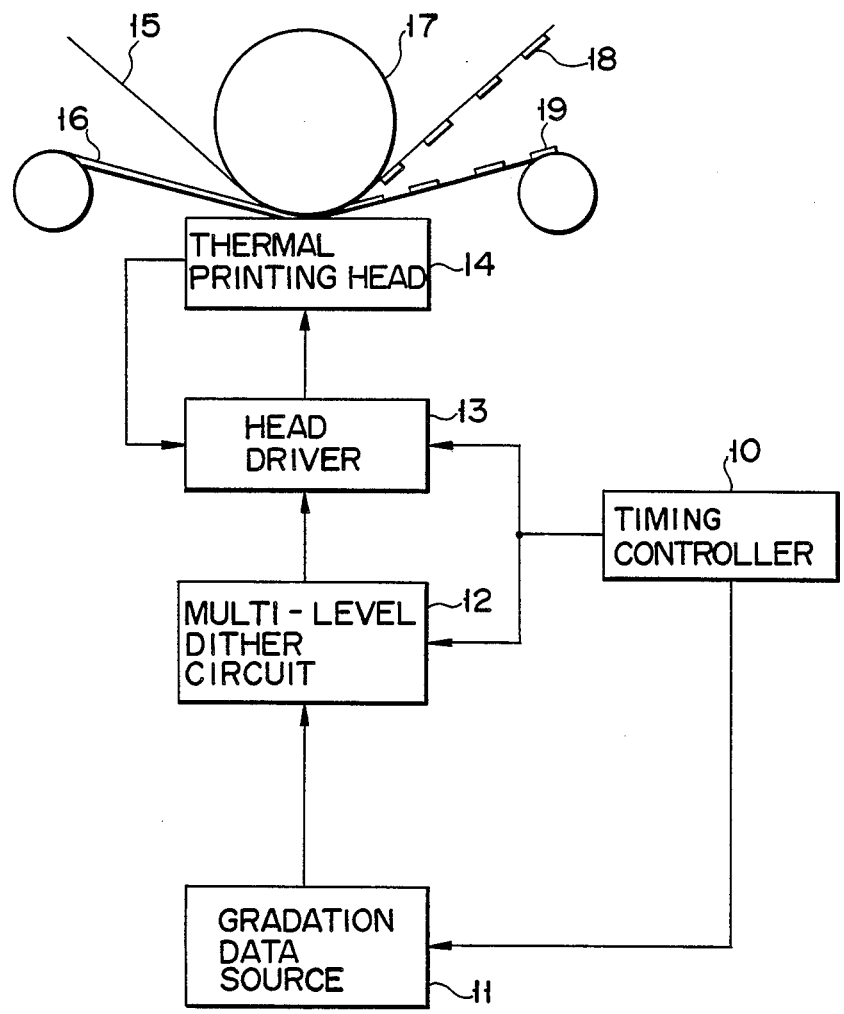
Figure 9:
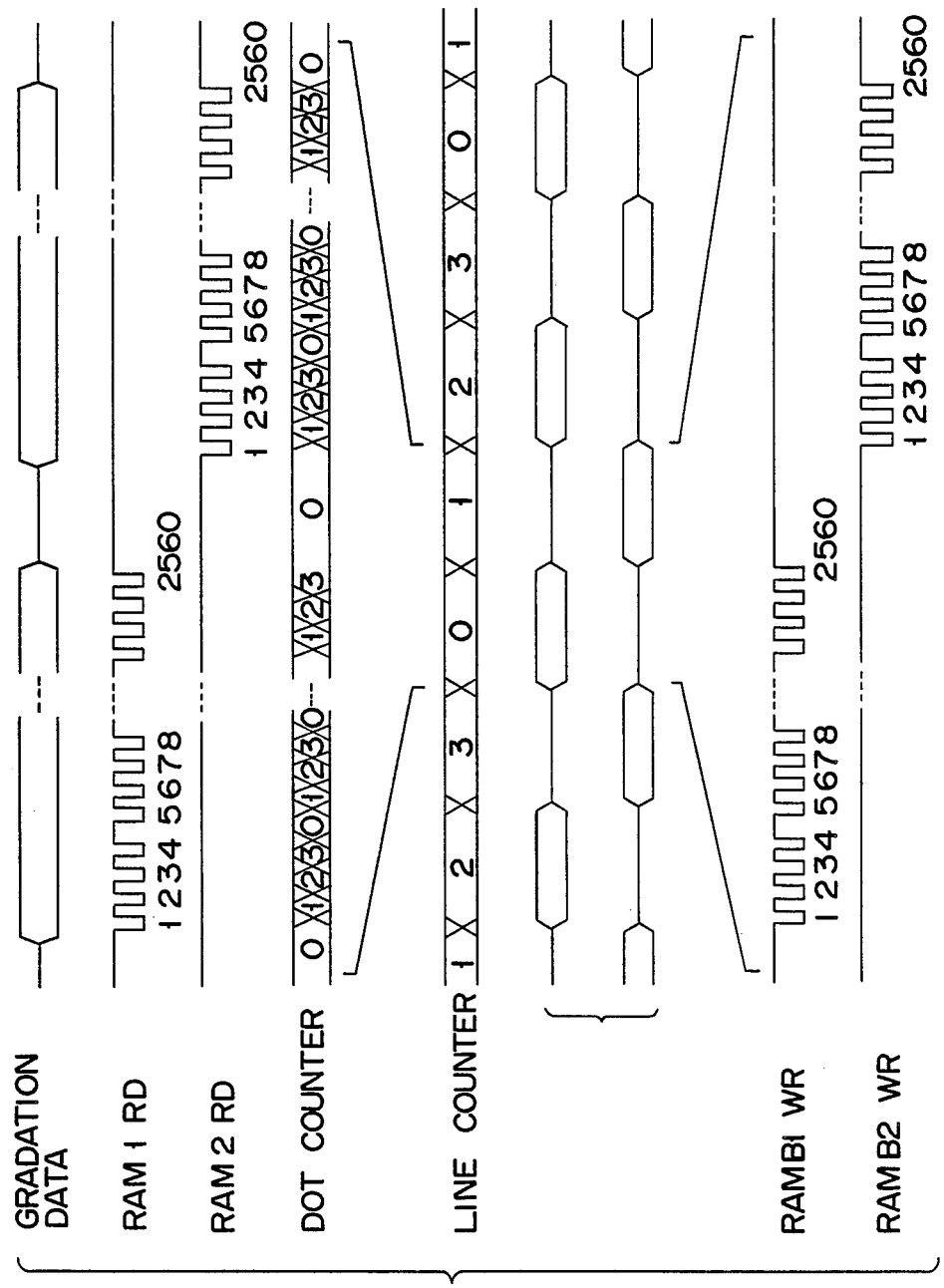

FIG. 7 illustrates the arrangement of a thermal printer that realizes the above half-tone image reproduction method. Gradation data outputted from a gradation data source 11 comprising a memory, etc. is supplied to a multi-level Dither circuit 12. The gradation data here is multi-level data that represents the density to be reproduced for each dot. Multi-level Dither circuit 12 compares the gradation data inputted for each dot wit the individual elements of N (=12) threshold level matrices T1-T12 each consisting of M (=4×4) elements, and selects the control level for each print dot from N+1 numerals (including level "0"), and sends it, as a control level signal, to a head driver 13. Actually, this multi-level Dither circuit 12 can be constituted simply by a ROM table (to be described later) which directly stores the comparison results. The control level signals for the N+1 numerals are converted, by head driver 13, into the amounts (pulse widths) of energy applied to the individual dots of a thermal head 14 and are supplied to the head 14. Thermal head 14, which is constituted by a number of heat generating resistor elements (not shown) arranged in line, heat-melts ink in an ink ribbon 16 while pressing a print set 15 toward a platen roller 17 through ink ribbon 16, thereby transferring ink on print sheet 15. The ink transferred onto print sheet 15 forms a printed image 18, and the other ink remains in ink ribbon 16. A timing controller 10 for controlling various timings supplies to gradation data source 11, multi-level Dither circuit 12 and head driver 13, timing signals necessary for synchronizing these components. FIG. 8 is a detailed block diagram of the aforementioned multi-level Dither circuit 12. The gradation data (8 bits) from gradation data source 11 is supplied to a buffer (RAM1) 20 and a buffer (RAM2) 21. Assuming that thermal head 14 is of a 2560 dot/line type which has 2560 heat generating elements arranged in the main scanning direction (the width direction of the print sheet perpendicular to the feeding direction of the sheet), The necessary capacity for the two buffers 20 and 21 is 8 bits×2560 dots which corresponds to one line of gradation data. Two buffers 20 and 21 are used here to cope with high-speed printing; the first line of data is written in buffer 20 and the next line of data is written in buffer 21, and thereafter, data of the individual lines are alternately written in buffers 20 and 21. With this design, it is possible to read out data from one buffer while writing data in the other buffer. Buffer 20 or 21 after completing the writing one line of data is in a ready state. After print one line is completed, a data readout signal RAM1RD or RAM2RD is generated and the second line of data is read out from buffer 20 or 21. This is illustrated by means of the timing charts shown in FIG. 9. This alternate writing and reading of gradation signals for 2560 dots is repeated until printing of one page is completed (until printing of the first color is completed in the case of color printing). According to this arrangement, the printing cycle can be set to 2 msec/line. When data is read out from buffer 20 or 21 by the RAM1RD signal or RAM2RD signal, it is supplied to a multi-level Dither matrix ROM 22. actually, multi-level Dither matrix ROM 22 directly stores multi control levels attained by the aforementioned threshold level matrices, not the threshold level matrices shown in FIG. 4. FIGS. 10A to 10D illustrate the contents of multi-level Dither matrix ROM 22. When given an input density level and print dot coordinates (x, y) as an address, ROM 22 directly outputs the control level data of the associated dot. For instance, given that input level "7" for the dot at x=1 and y=2 is supplied from gradation data source 11, the control level outputted from ROM 22 would be "8". The following is the relationship between the input density levels and the types of the applied energy changing rules.

| Input Density Levels | 0–7 → Type 1 |
|---|---|
| | 8–34 → Type 2 |
| | 36–39 → Type 3 |
| | 40–74 → Type 4 |
| | 75–111 → Type 6. |

The multi-level Dither matrices may be stored in a RAM instead of a ROM.

Data (x, y) of a dot position given as part of an address of multi-level Dither matrix ROM 22 consists of the output (2 bits) of a line counter 23 (FIG. 8) and the output (2 bits) of a dot counter 24 (FIG. 8). As should be obvious from the timing chats in FIG. 9, dot counter 24 performs the count operation from 0 to 3 in synchronism with the RAM1RD or RAM2RD signal and outputs the x coordinate, and line counter 24 up-counts every time the RAM1RD or RAM2RD signal is counted 2560 times and outputs the y coordinate from 0 to 3.

In FIG. 8, the 6-bit serial output (control level) of multi-level Dither matrix ROM 22 is sent to a buffer (RAMB1) 25 and a buffer (RAMB2) 26. This data represents the amount of energy supplied to the individual heating elements of the pint head. Both of buffers 25 and 26 have a capacity of 6 bits×2560 dots and these buffers for two lines are also used for high-speed printing. As shown by the timing charts in FIG. 9, these buffers 25 and 26 are alternately accessed for data writing by RAMB1WR and RAMB2WR signals and alternately accessed for data readout by RAMB1RD and RAMB2RD signals.

Figure 12:
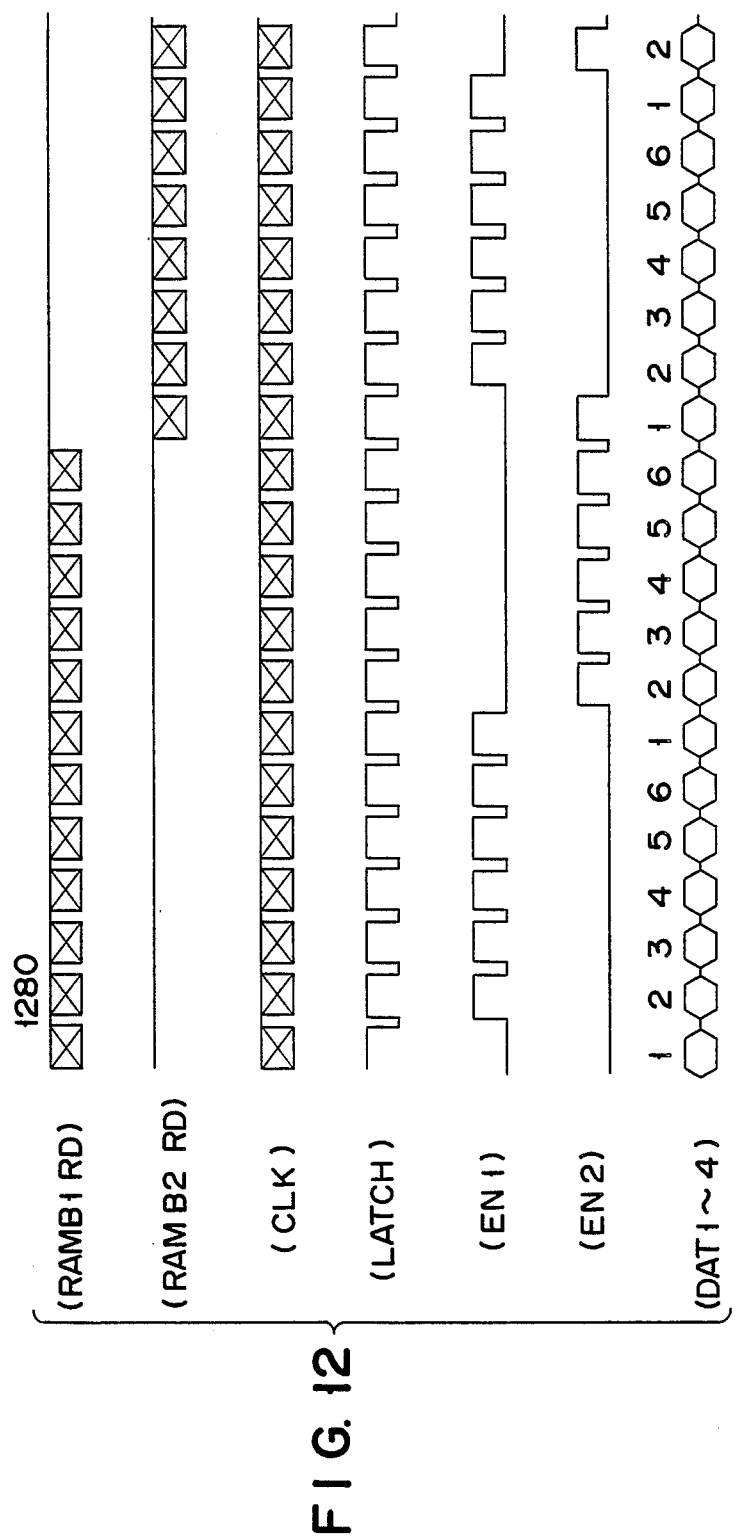

FIG. 11 is a detailed block diagram of head drive 13 shown in FIG. 8, and FIG. 12 is its timing chart. Here, thermal print head 14 is driven in two phases, so that there are two drivers for two systems. The data converted into the amount of supplied energy in multi-Dither circuit 12 is supplied to a shift register 30a whose output is transferred to a shift register 30b. Shift registers 30a and 30b are supplied with the same clock and supply their outputs in parallel to latch circuits 31a and 31b, respectively. The latch circuits 31a and 31b are supplied with the same latch signal and are alternately supplied with enable signals EN1 and EN2 as shown in FIG. 12. Outputs of gates 32a and 32b are supplied through their respective drivers 33a and 33b to the heat generating elements of the respective phase of thermal print head 14.

Head driver 13 may be designed to have a parallel signal as its input; in this case, however, multi-level Dither circuit 12 should have a parallel output signal.

According to this embodiment, the temperature of thermal print head 14 is fed back to head driver 13, as shown in FIG. 7, for the following reason. Even with the same amount of supplied energy, the amount of ink to be transferred varies depending on the heat accumulated in thermal print head 14 itself and the ambient temperature, so that the supplied energy should be properly controlled in accordance with the detected temperature of head 14 itself. Given that the amount of energy at the normal temperature (Tn) is 100% as shown in FIG. 13, this control reduces the supplied energy with an increase in temperature and increases the energy with a decrease in temperature. This control, therefore, can ensure that a predetermined amount of ink is always transferred irrespective of the heat accumulated in thermal print head 14. Such control can be realized by supplying the output of a temperature-detecting thermistor 40 coupled to thermal print head 14 to head drive 13 through an A/D converter 41, as shown in FIG. 14. The temperature control for thermal print head 14 can be realized by narrowing the pulse widths of enable signals EN1 and EN2 supplied to gates 32a and 32b of FIG. 11 from A1 and B1 to A2 and B2 as shown in FIG. 15 or narrowing the amplitudes of the output voltages of drivers 33a and 33b from A1 and A2 to A3 and B3 as shown also in FIG. 15.

Figure 16:
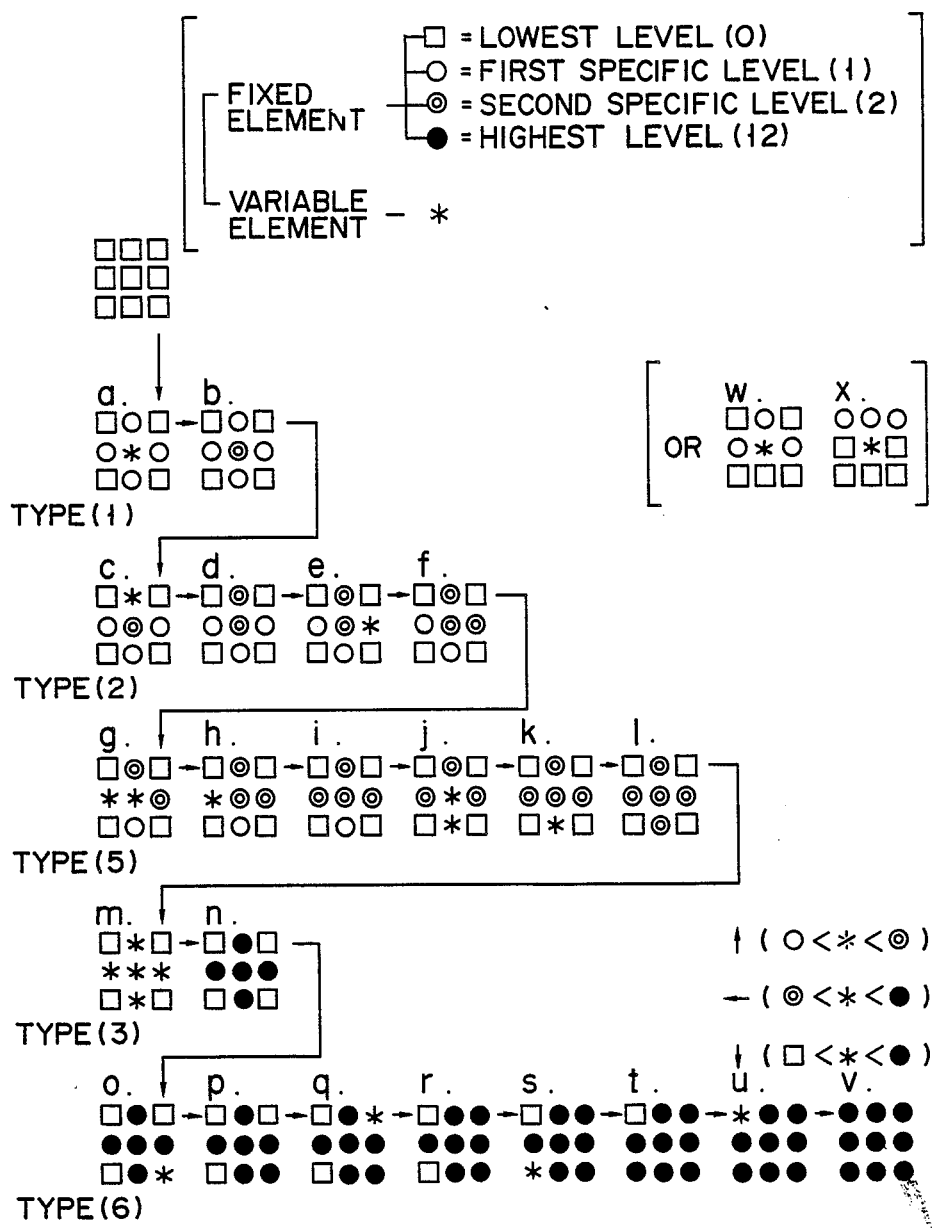
FIG. 16 is an explanatory diagram of the individual energy changing rules used in a thermal printer according to another embodiment of this invention.

According to the above embodiment, a Dither pattern of 4×4 dots is used; however, this is just one example of applicable Dither patterns and other patterns may well be used. For instance, FIG. 16 illustrates an example using 3×3 matrices, in which Type 5 is included instead of Type 4 which is involved in the example of FIG. 3. Patterns g-1 correspond to Type 5. In patterns g and j, of those dots whose levels have reached level "8" (◎) in the previous reproduced density, there are dots whose control levels are reduced even when the density to be reproduced is increased. (See those center dots in patterns g and j which are marked by "*".) In Type 5, since there are dots whose control levels are increased and the ones whose control levels are decreased, it is necessary to use multi threshold levels which are not monotonous to an increase in density. According to Type 5, when gradation jump occurs due to an increase in the number of dots used in printing, a sharp increase in print area can be adjusted by reducing the energy supplied to other dots. Type 5 is, therefore, effective for a small matrix, such as of 3×3.

It should be readily apparent to provide various modifications, such that the rules of the aforementioned types are used for a low density region while using rules of other types for intermediate and high density regions, or the rules of the exemplified types are used for an intermediate density region while using rules of other types of low and high density regions. In these cases, the adapted rules can of course contribute to realizing smooth gradation expression and achieving the object of this invention.

A description will be given of another embodiment of this invention referring to FIGS. 17–22.

This embodiment differs from the first embodiment only in the contents of multi-level Dither matrix ROM 22, so that the hardware arrangement of this embodiment will not be illustrated.

A dot pattern for providing a stable print image is the one which is difficult to be merged with an adjacent pattern in low and intermediate density regions and which is easy to be merged with the adjacent pattern at the desired position in intermediate and high density regions. Further, in consideration of the thermal influence of, and the influence of electric/magnetic field of, the adjacent pattern onto the target pattern, the desirable pattern would be the one whose thermal distribution, electric-field distribution, etc. are symmetric with respect to the main scanning direction or sub-scanning direction. With these conditions considered, the following patterns are desirable.

I. Isolated Dot Pattern.

II. Pattern in which dots extend in at east one of the main scanning and sub-scanning directions and the dots come contact with an adjacent block only at one section ("block" is a collection of print dot corresponding to a multi-level Dither matrix).

For ease of understanding, these patterns will be explained below with reference to a thermal printer and FIG. 17. Pattern a1 corresponds to the above pattern I; this pattern is formed by one dot in a block, and can avoid thermal interference with an adjacent block. A plurality of isolated dot patterns can be provided as long as the thermal interference does not occur within one block. In this case, however, to avoid thermal influence between dots, the matrix should not be large, thus reducing the resolution.

A key pattern and a cross-shaped pattern are typical examples of pattern II. Patterns a2–a5 in FIG. 17 correspond to this pattern II, according to which merging with an adjacent pattern occurs earliest at a protruding section. Merging with the adjacent pattern surely at one section in this manner can prevent unintended pattern merging with other sections. This can reduce random ink transfer or deformation and can therefore provide a high print quality with less noise.

Figure 17:
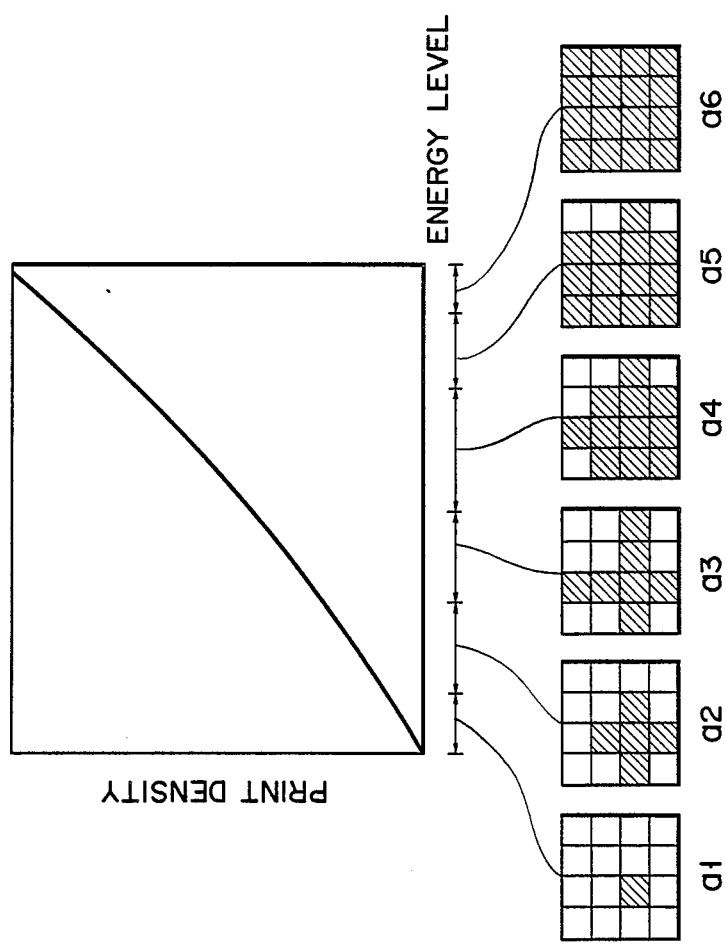

As shown in FIG. 17, the energy level is divided into six partial ranges according to this embodiment. The aforementioned patterns a1–a6 are assigned to the respective partial ranges. These partial ranges to which patterns a1–a6 are applied may partially overlap. In this case, at an overlapped density region, generation of noise at the pattern changing point is suppressed by utilizing a process for selecting, and using, patterns corresponding to input images one at a time, thereby further improving the image quality. According to this embodiment, 64 gradations are expressed for a 6-bit (0–63) input signal for one dot, so that six dot patterns a1–a6 are used which uses a 4×4 matrix as a unit of gradation expression (one block) and has 10 control levels per dot.

Pattern a1, as mentioned earlier, is constituted by an isolated dot which is formed at the center of the block. This can suppress the thermal influence of this pattern on other patterns at a low density region. Patterns a2 and a3, which are cross-shaped patterns, have a row of dots contiguously formed in the vertical direction and another row of dots formed by a pulse signal with small duty and can provide the most stable print patterns. Pattern a4 contacts two of four adjacent blocks only at one of its constituent dots each. Stable ink transfer can be executed a those pattern merging sections where the contacting two dots come contact with the two adjacent blocks. Arranging a plurality of patterns a4 provides a cross shape in white, as shown in FIG. 21, and the result pattern would be a negative pattern of pattern a2. Therefore, based on the same principle as involved for pattern a2, stable printing is possible. Pattern a5 contacts only one of the four adjacent blocks at one dot, and it can, like pattern a4, provide stable pattern merging at the position where it contacts with that one adjacent block. Further, since this pattern is vertically continuous with the width of lateral three dots, given that the lateral direction is the main scanning direction of the thermal head and the vertical direction is its subscanning direction, the part of pattern a5 which correspond to these lateral three dots can be continuously driven in the sub-scanning direction. Accordingly, with regard to the sub-scanning direction for those three dots, a stable print pattern can be attained without fine thermal control as per printing in black. Since the center or the center of gravity is defined at the same position in a matrix for all the patterns, stable pattern merging can be effected between adjacent blocks.

Figure 18:
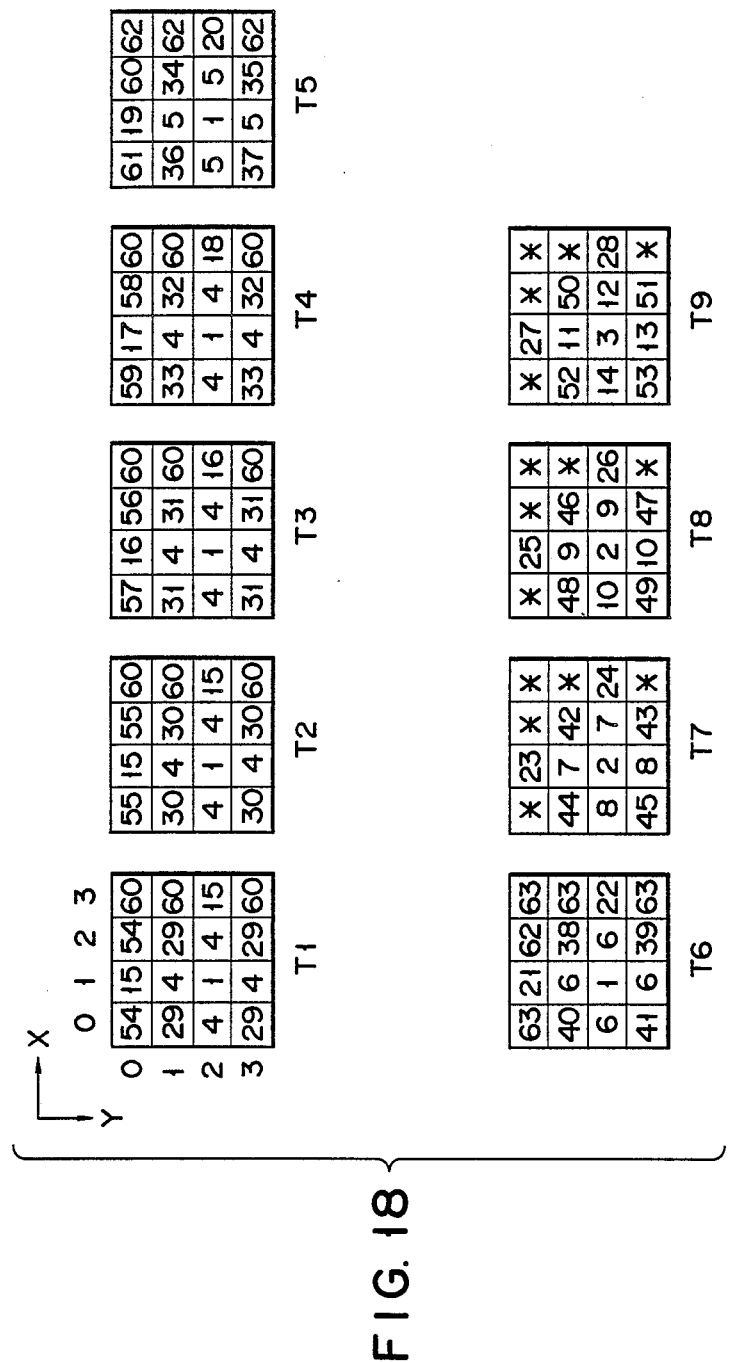
Figure 19:
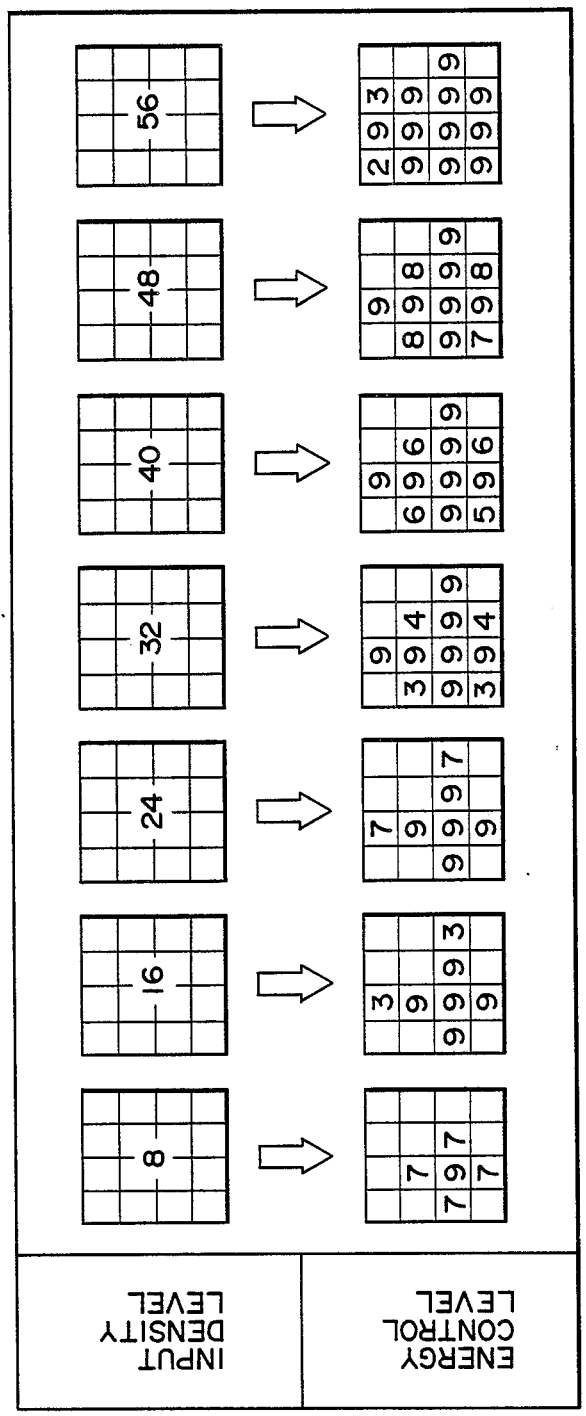

FIG. 18 illustrates a threshold level matrix group used in a multi-level Dither process for forming the aforementioned patterns a1–a6. There are nine matrices in the group, namely, T1–T9, whose functions are the same as those explained with reference to the first embodiment. Given that the input density level $I(x, y)$, energy control level $P(x, y)$ and threshold levels $Tn(x, y)$ ($1 \leq n \leq 9$) with respect to the elements of each matrix $(x, y)$, the control level $P(x, y)$ is defined as follows.

If $I(x, y) < T1(x, y)$, $P(x, y) = 0$.

If $T1(x, y) \leq I(x, y) < T2(x, y)$, $P(x, y) = 1$.

If $T2(x, y) \leq I(x, y) < T3(x, y)$, $P(x, y) = 2$.

$\cdot$ $\cdot$ $\cdot$

If $T8(x, y) \leq I(x, y) < T9(x, y)$, $P(x, y) = 8$.

If $T9(x, y) \leq I(x, Y)$, $P(x, y) = 9$.

If $Ti(x, y) = Tj(x, y)$ ($i < j$), $I(x, y)$ is compared with the threshold level $Tj(x, y)$. The mar "*" ii FIG. 18 indicates threshold levels greater than the maximum input level. For instance, if input level $I(0, 3) = 30$ with respect to the coordinates of the lower left corner in the matrix, $(x, y) = (0, 3)$, since $T2(0, 3) \leq I(0, 3) < T3(0, 3)$, control level $P(0, 3) = 2$ is selected. The above threshold level processing rules are given just as examples, and this invention is in no way limited to those particular rules.

When an image with small gradation change is inputted, energy control level data is produced, which is one pattern selected from patterns a1–a6, as shown in FIG.

19. When the same level is inputted for adjacent matrices, the output patterns would be the same. With pattern a3 selected, therefore, a plurality of cross-patterns are coupled as shown in FIG. 20. With pattern a4, cross-shaped patterns in white are arranged as shown in FIG. 21. Therefore, coupling adjacent patterns at projecting sections can provide a high image quality with less noise.

Figure 22:
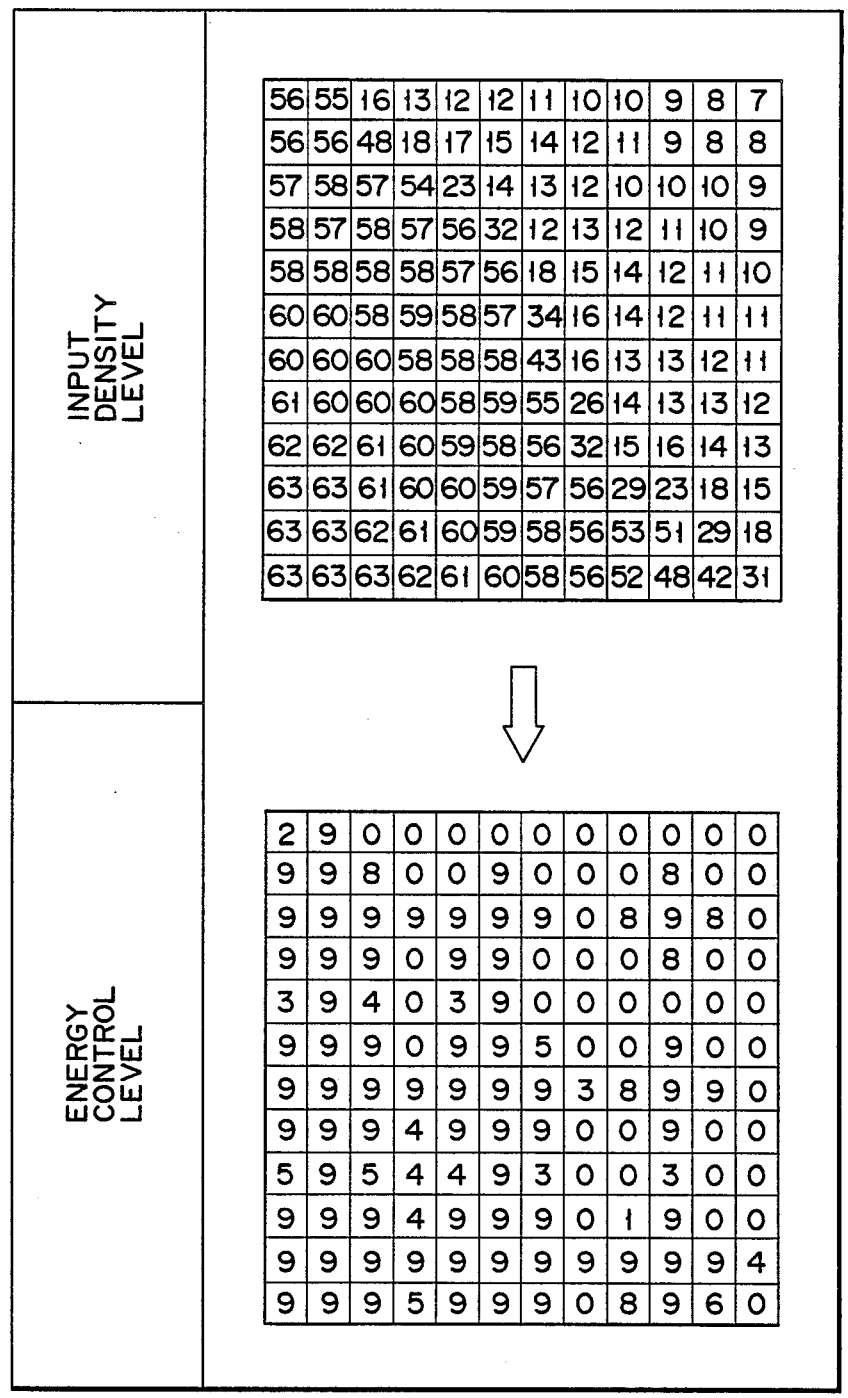

If the density change in a matrix is sharp, the output control level may not take the form of patterns a1–a6 and well expresses the positional information of the individual elements of an edge structure, as shown in FIG. 22. In this case, although gradation deformation occurs, this would not raise any problem because a high gradation is not generally demanded at those image regions where resolution is important, such as the edge portion of the image.

Figure 23:
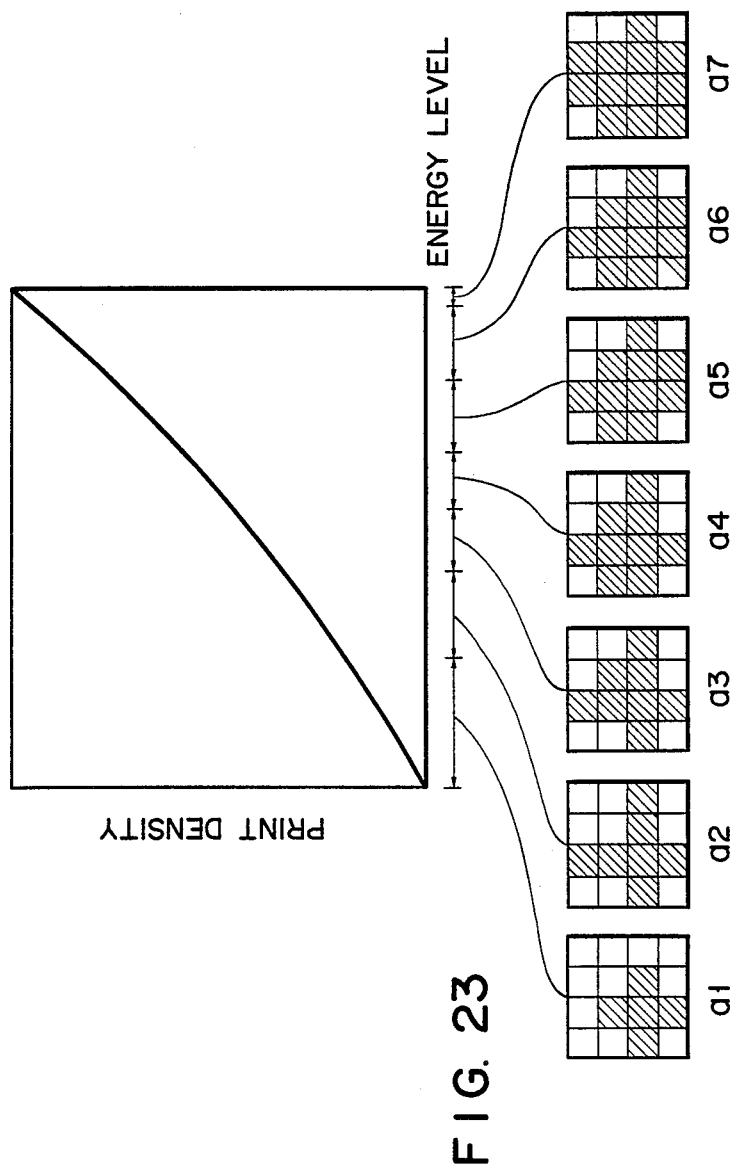
FIG. 23 is a diagram illustrating the relationship between a print density and a pattern as applied in the individual partial ranges of an energy control range for a thermal printer according to a still another embodiment of this invention.

FIG. 23 illustrated a still another embodiment.

Figure 24:
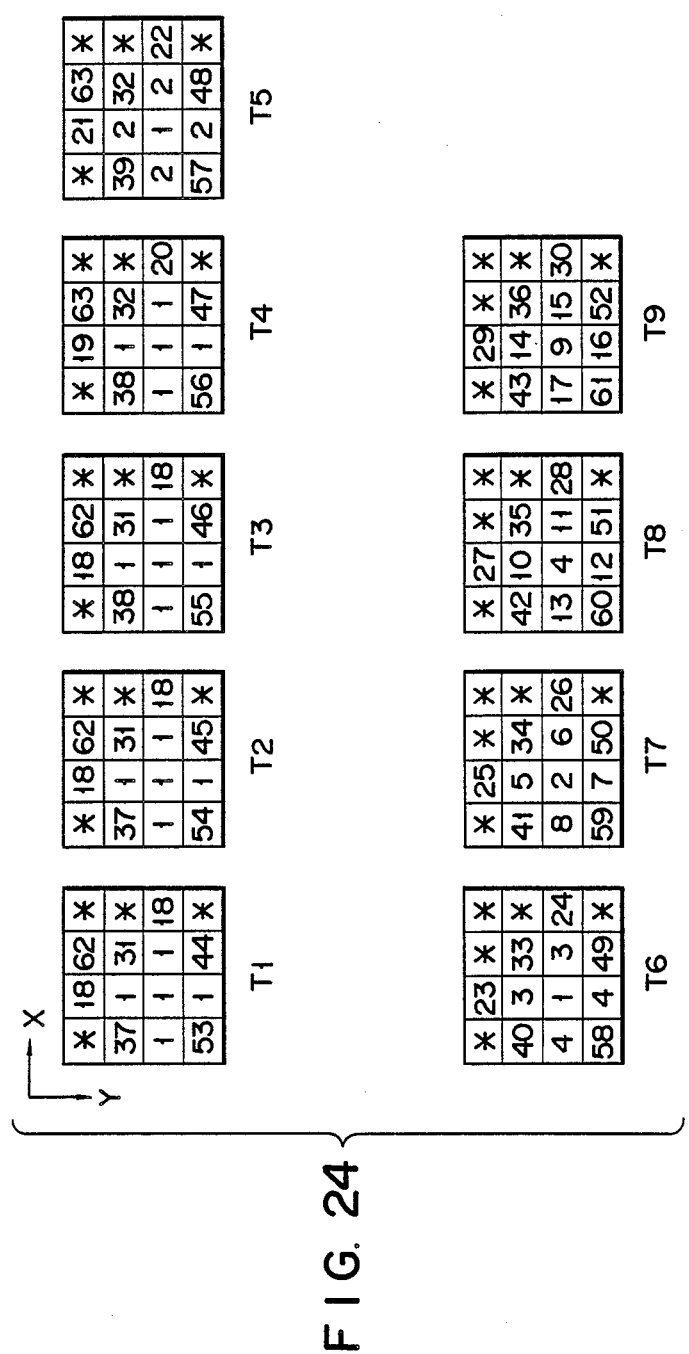
FIG. 24 is a diagram illustrating threshold level matrices for attaining the pattern.

According to this embodiment, as per the foregoing embodiment, energy control levels of 64 gradations are outputted with respect to gradation data of 6 bits per dot. There are seven dot patterns b1–b7 used in this embodiment. Each pattern has 10 control levels (0–9) per dot with a 4×4 matrix as a unit of gradation expression. The significant differences from the second embodiment are that a cross-shaped pattern b1 consisting of 5 dots, not an isolated dot pattern, is used to express the lowest density, and that pattern b7 consisting of 12 dots, not a so-called black pattern, is used to express the highest density. FIG. 24 exemplifies a threshold level matrix group for this case. The threshold level processing can be done using the same rules as used in the second embodiment.

Figure 25:
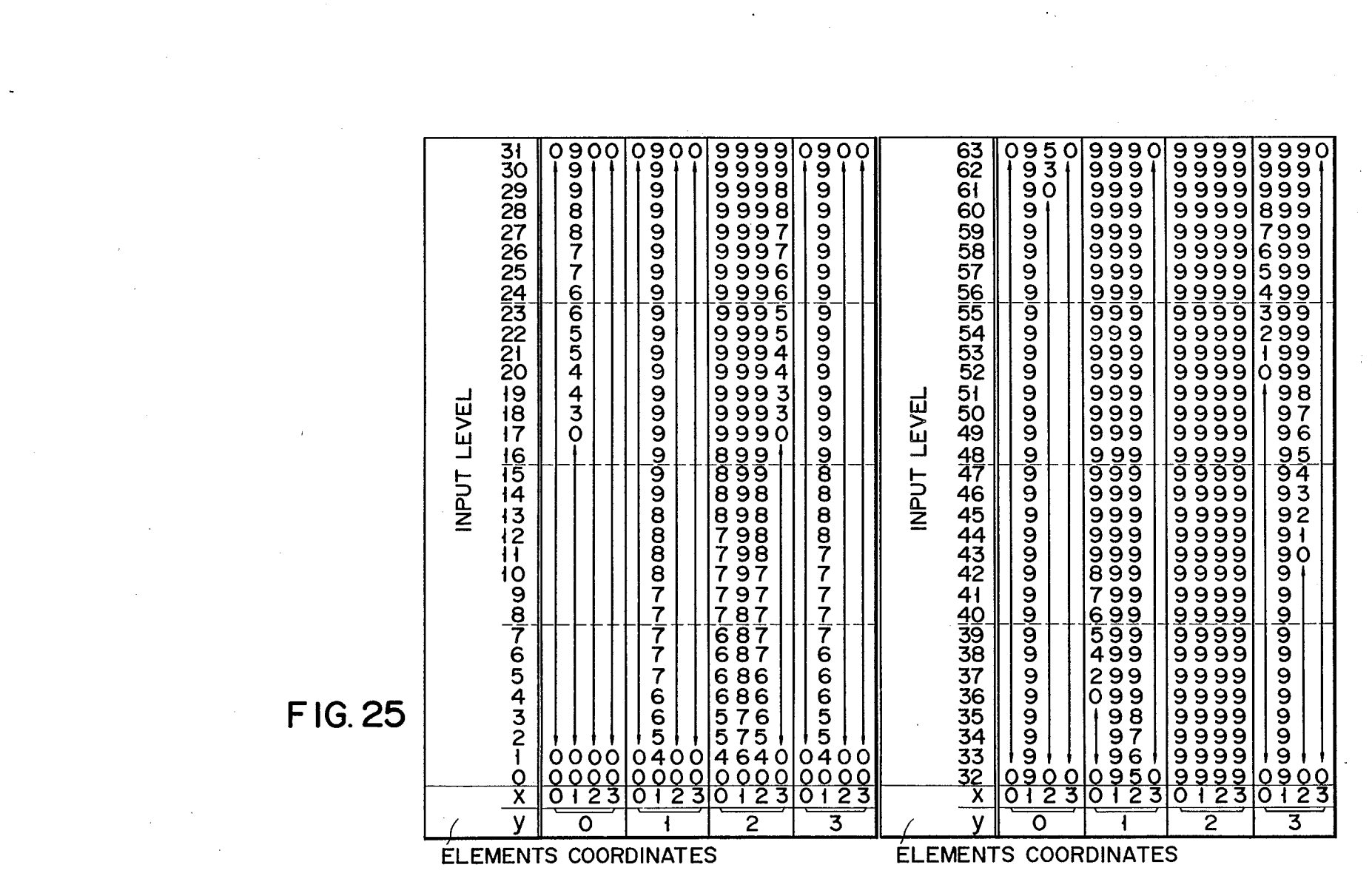

In an actual printer, as mentioned earlier, a ROM table for directly converting the input level into an energy control level is often used in consideration of the threshold level matrix. In this case, the input and output relation is set, for example, as shown in FIG. 25. In this example, the energy control level for input level "1" is 4, 4, 6, 4, 4 (see the row for input level "1" in FIG. 25). The total amount of energy within this matrix corresponds to the amount of energy required for expressing the lowest density of an output apparatus as used in this embodiment. In this case, although energy is applied to five dots, not all of the five dots are actually formed, but a fine ink transfer pattern is attained only for the dot of the center element (x, y)=(1, 2). Heating surround dots by applying such energy that ink transfer would not occur with respect to only a single dot can ensure fine ink transfer onto the dot at the center of tee surround dots and can provide a print image with no dot loss and reduced noise. Further increase in input level increases the amount of transferred ink (the area and height of the transferred ink), so that ink will eventually be transferred to the remaining four dots to which energy is being applied. For attaining the highest density, pattern b7 is selected and the energy disclosed in the row for input level 63 in FIG. 25 is supplied to the individual dots. In this case ink is transferred to non-printed dots due to propagation of generated heat, this providing black density.

Figure 26:
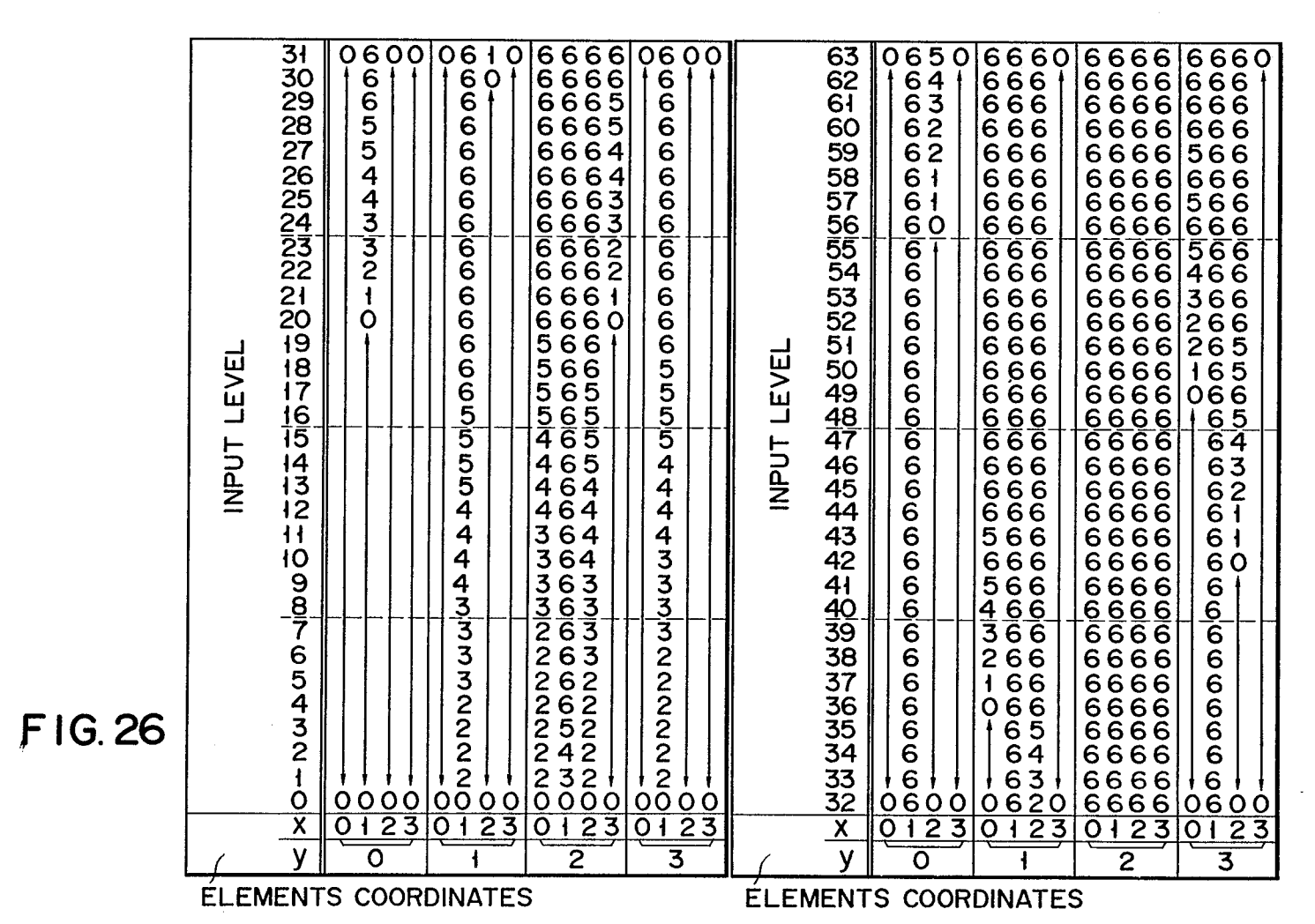

According to the above embodiment, there may be an insufficient number of control levels due to restriction by printing speed or circuit design. FIG. 26 illustrates a modification of the one shown in FIG. 25, which is made to the way the amount of energy is given in such a case. Although the same patterns as involved in the previous case are used, there are seven control levels (0–6) per dot. In this modification, there are dots whose control levels decrease at transition points from pattern b4 to pattern b5, from b5 to b6, and from b6 to b7 (corresponding to input levels 42→43, 49→50 and 56→59). This is because the amount of ink transfer at these points cannot be controlled by the lowest control level due to an increase in the number of print dots, so that the control levels of other dots are reduced to compensate it. Such compensation of the amount of applied energy can ensure smooth gradation expression by an output apparatus having a small number of control levels.

Although the above description has been given with reference to a thermal printer to which this invention is applied, this invention is in no way limited to the thermal printer, but can be applied to optical printers, such as a laser beam printer and a LED printer, as well. FIG. 27 illustrates a laser beam printer to which this invention is applied. Timing controller 10, gradation data source 11 and multi-level Dither circuit 12 are the same as the ones shown in FIG. 7. In this apparatus, the energy control level signal from multi-level Dither circuit 12 is supplied to a laser diode driver 51, which determines the voltage, current, drive pulse, etc. for driving a laser diode, based on the received control level signal and outputs a drive signal. A laser diode and laser printer optical system 52 is driven by the drive signal from laser diode driver 51 to emit a laser beam. This laser beam scans a photosensitive drum (not shown) to form an electrostatic latent image for image printing.

This laser beam printer, due to the application of this invention, can provide a high image reproduction characteristic which smoothens the charge distribution and eliminates undesirable gradation jump.

According to this invention, matrices are not limited to the exemplified sizes, and may have different sizes, such as 6×6 and 8×8.

What is claimed is:

1. A half-tone image reproduction method comprising the steps of:

storing a Dither matrix consisting of M (M being an integer greater than or equal to 2) elements for expressing a half-tone image as a whole, each element of said Dither matrix having an information representing the relation between an input density level representing a half-tone image and an energy control level representing a print energy, said energy control level for each element being determined by comparing the input density level with N (N being an integer greater than or equal to 2) different threshold levels, a whole density range able to be represented by the input density level being divided into a plurality of partial density ranges, and said energy control level for each element in each partial density range being set in accordance with respective different rules, each rule providing a relation between a change in energy control level and a change in input density level for each of a plurality of the partial density ranges;

selecting the energy control level by specifying the element of said Dither matrix and the input density level; and forming a print dot in accordance with said selected energy control level.

2. The half-tone image reproduction method according to claim 1, wherein said energy control level for each element is determined by fist rule in a low density range for changing an energy control level of a specific element while giving a constant low energy control level to elements around said specific element, second rule in an intermediate range for generally changing energy control levels of a plurality of elements by a substantially some amount, and third rule in a high density range for changing an energy control level of only a specific element and changing energy control levels of other elements when said energy control level of said specific element reaches a predetermined level.

3. The half-tone image reproduction method according to claim 1, wherein said Dither matrix for use in one of the partial density range is constituted by fixed elements fixed to a constant energy control level p and one variable element whose energy control level is changed to a level greater than said constant energy control level p in accordance with a density to be reproduced.

4. The half-tone image reproduction method according to claim 1, wherein said Dither matrix for use in one of the partial range is constituted by a group of fixed elements fixed to at least two energy control levels p and P ($0 < p < P \leq N$) and one variable element whose energy control level is changed between 0 and P in accordance with an input density level 5. The half-tone image reproduction method according to claim 1, wherein said Dither matrix for use in one of the partial density range is constituted by a group of Q ($2 \leq Q < M$) variable elements whose energy control levels are changed in accordance with an input density level.

6. The half-tone image reproduction method according to claim 5, wherein said Dither matrix includes at least one element of a constant energy control level R ($0 < R \leq N$) in a group of fixed elements other than said group of variable elements.

7. The half-tone image reproduction method according to claim 1, wherein said Dither matrix for use in one of the partial density range includes both of an element whose energy control level is increased and an element whose energy control level is decreased with a change in input density level.

8. A half-tone image reproduction apparatus comprising:
a Dither matrix memory for storing a Dither matrix consisting of M (M being an integer greater than or equal to 2) elements for expressing a half-tone image as a whole, each element o said Dither matrix having an information representing the relation between an input density level representing a half-tone image and an energy control level representing a print energy control level for each element being determined by comparing the input density level with N (N being an integer greater than or equal to 2) different threshold levels, a whole density range able to be represented by the input density level being divided into a plurality of partial density ranges, and said energy control level for each element in each partial range being set in accordance with respective different rules, each rule providing a relation between a change in energy control level and a change in input density level for each of a plurality of the partial density ranges;
input data supplying means for supplying to said Dither matrix memory the element of said Dither matrix and the input density level as input data; and
print dot forming means for forming a print dot in accordance with energy control level data selectively read out from said Dither matrix memory.

9. The half-tone image reproduction apparatus according to claim 8, wherein said Dither matrix memory stores said energy control level for each element determined by first rule in a low density range for changing an energy control level of a specific element while giving a constant low energy control level to elements around said specific element, second rule in an intermediate range for generally changing energy control levels of a plurality of elements by a substantially same amount, and third rule in a high density range for changing an energy control level of only a specific element and changing energy control levels of other elements when said energy control level of said specific element reaches a predetermined level.

10. The half-tone image reproduction apparatus according to claim 8, wherein said Dither matrix memory stores said Dither matrix for use in one of the partial density ranges which is constituted by fixed elements fixed to a constant energy control level p and one variable element whose energy control level is changed to a level greater than said constant energy control level p in accordance with a density to be reproduced.

11. The half-tone image reproduction apparatus according to claim 8, wherein said Dither matrix memory stores said Dither matrix for use in one of the partial range which is constituted by a group of fixed elements fixed to at least two energy control levels p and P ($0 < p < P \leq N$) and one variable element whose energy control level is changed between 0 and P in accordance with an input density level.

12. The half-tone image reproduction apparatus according to claim 8, wherein said Dither matrix memory stores said Dither matrix for use in one of the partial density ranges is constituted by a group of Q ($2 \leq Q < M$) variable elements where energy control levels are changed in accordance with an input density level.

13. The half-tone image reproduction apparatus according to claim 12, wherein said Dither matrix memory stores said Dither matrix including at least one element of a constant energy control level R ($0 < R \leq N$) in a group of fixed elements other than said group of variable elements.

14. The half-tone image reproduction apparatus according to claim 8, wherein said Dither matrix memory stores said Dither matrix for use in one of the partial density ranges including an element whose energy control level is increased and an element whose energy control level is decreased with a change in input density level.

15. A half-tone image reproduction method comprising the steps of:
storing a Dither matrix consisting of M (M being an integer greater than or equal to 2) elements for expressing a half-tone image as a whole, each element of said Dither matrix having an information representing the relation between an input density level representing a half-tone image and an energy control level representing a print energy, said energy control level for each element being determined by comparing the input density level with N (N being a integer greater than or equal to 2) different threshold levels, a whole density range able to be represented by the input density level being divided into a plurality of partial density ranges, and said energy control level for each element in each partial density range being set in accordance with respective different rules, the rule for use in at least one of the partial ranges providing a change in energy control level and a change in input density level, said change in energy control level being set in such a way that a dot pattern expands or contracts along a line extending in a main scanning direction and a subscanning direction passing a position of a fixed element in said Dither matrix;

selecting the energy control level by specifying the element of said Dither matrix and the input density level; and forming a print dot in accordance with said selected energy control level.

16. The half-tone image reproduction method according to claim 15, wherein said Dither matrix for use in one of the partial density range is determined in such a way as to form a cross-shaped dot pattern.

17. The half-tone image reproduction method according to claim 15, wherein said Dither matrix for use in one of the partial density range is determined in such a way as to form a cross-shaped blank pattern.

18. The half-tone image reproduction method according to claim 15, wherein said Dither matrix for use in one of the partial density range is determined in such a way that said dot pattern is coupled at one point to at least one of four dot patterns surrounding and adjacent to said dot pattern.

19. The half-tone image reproduction method according to claim 15, wherein said Dither matrix is determined in such a way that the fixed element is an element at a center, or a center of gravity, of said Dither matrix.

20. The half-tone image reproduction method according to claim 15, wherein said Dither matrix for use in one of the partial density range is determined in such a way that said dot pattern is an isolated pattern not abutting on a periphery of said Dither matrix.

21. A half-tone image reproduction apparatus comprising:

a Dither matrix memory for storing a Dither matrix consisting of M (M being an integer greater than or equal to 2) elements for expressing a half-tone image as a whole, each element of said Dither matrix having an information representing the relation between an input density level representing a half-tone image and an energy control level representing a print energy, said energy control level for each element being determined by comparing the input density level with N (N being an integer greater than or equal to 2) different threshold levels, a whole density range able to be represented by the input density level being divided into a plurality of partial density ranges, and said energy control level for each element in each partial range being set in accordance with respective different rules, the rule for use in at least one of the partial ranges providing a change in energy control level and a change in input density level, said change in energy control level being set in such a way that a dot pattern expands or contracts along a line extending in a main scanning direction and a subscanning direction passing a position of a fixed element in said Dither matrix;

input data supplying means for supplying to said Dither matrix memory the element of said Dither matrix and the input density level as input data; and print dot forming means forming a print dot in accordance with energy control level data selectively read out from said Dither matrix memory.

22. The half-tone image reproduction apparatus according to claim 21, wherein said Dither matrix memory stores said energy control level for each element determined in such a way as to form a cross-shaped dot pattern in one of the partial density.

23. The half-tone image reproduction apparatus according to claim 21, wherein said Dither matrix memory stores said energy control level for each element determined in such a way as to form a cross-shaped blank pattern in one of the partial density range.

24. The half-tone image reproduction apparatus according to claim 21, wherein said Dither matrix memory stores said energy control level for each element determined in such a way that said dot pattern is coupled at one point to at least one of four dot patterns surrounding and adjacent to said dot pattern in one of the partial density range.

25. The half-tone image reproduction apparatus according to claim 21, wherein said Dither matrix memory stores said energy control level for each element determined in such a way that the fixed element is an element at a center, or a center of gravity, of said Dither matrix.

26. The half-tone image reproduction apparatus according to claim 21, wherein said Dither matrix memory stores said energy control level for each element determined in such a way that said dot pattern is an isolated pattern not abutting on a periphery of said Dither matrix in one of the partial density range.

27. A half-tone image reproduction method comprising the steps of:

forming $i$ ($i$ being an integer not less than two) different Dither matrices, each matrix comprising a two-dimensional array of different threshold values for determining one of $(i+i)$ print energy control levels, the Dither matrices being formed such that a level changing rule denoting a relationship between an input density level representing a half-tone image and the print energy control level for each partial density range is different from others, the partial density range being obtained by dividing into a plurality of partial density ranges an entire density range which can be represented by the input density level;

comparing the input density level and threshold values in corresponding components of all the Dither matrices, to generate a multi-level print energy control signal in accordance with a comparison result, the energy control level determined in accordance with which Dither matrix has a threshold value higher than said input density level and which Dither matrix has a threshold value not higher than said input density level; and forming a print dot in accordance with the multi-level print energy control level.

28. The half-tone image reproduction method according to claim 27, wherein said energy control level for each element is determined by first rule in a low density range for changing an energy control level of a specific element while giving a constant low energy control level to elements around said specific element, second rule in an intermediate range for generally changing energy control levels of a plurality of elements by a substantially same amount, and third rule in a high density range for changing an energy control level of only a specific element and changing energy control levels of other elements when said energy control level of said specific element reaches a predetermined level.

29. The half-tone image reproduction method according to claim 27, wherein said Dither matrix for use in one of the partial density range is constituted by fixed elements fixed to a constant energy control level p and one variable element whose energy control level is changed to level greater than said constant energy control level p in accordance with a density to be reproduced.

30. The half-tone image reproduction method according to claim 27, wherein said Dither matrix for use in one of the partial range is constituted by a group of fixed elements fixed to at least two energy control levels p and P ($0<p<P\leq N$) and one variable element hose energy control level is changed between 0 and P in accordance with an input density level.

31. The half-tone image reproduction method according to claim 27, wherein said Dither matrix for use in one of the partial density range is constituted by a group of Q ($2\leq Q<M$) variable elements whose energy control levels are changed in accordance with an input density level.

32. The half-tone image reproduction method according to claim 31, wherein said Dither matrix includes at least one element of a constant energy control level R ($0<R\leq N$) in a group of fixed elements other than said group of variable elements.

33. The half-tone image reproduction method according to claim 27, wherein said Dither matrix for use in one of the partial density range includes both of an element whose energy control level is increased and an element whose energy control level is decreased with a change in input density level.

34. A half-tone image reproduction apparatus comprising:
means for storing a relationship between an input density level representing as half-tone image and the print energy control level, the relationship for each partial density range being determined by the respective rules which define how the print energy control level for forming print dot varies in accordance with changes in the input density level, the partial density range being obtained by dividing into a plurality of partial density ranges an entire density range which can be represented by the input density level;
means for reading out the print energy control level from said storing means; and
wherein a print dot is formed in accordance with the print energy control level read out by said reading means.

35. The half-tone image reproduction apparatus according to claim 34, wherein said Dither matrix memory stores sad energy control level for each element determined by first rule in a low density range for changing an energy control level of a specific element while giving a constant low energy control level to elements around said specific element, second rule in an intermediate range for generally changing energy control levels of a plurality of elements by a substantially same amount, and third rule in a high density range for changing an energy control level of only a specific element and changing energy control levels of other elements when said energy control level of said specific element reaches a predetermined level.

36. The half-tone image reproduction apparatus according to claim 34, wherein said Dither matrix memory stores said Dither matrix for use in one of the partial density ranges which is constituted by fixed elements fixed to a constant energy control level p and one variable element whose energy control level is changed to a level greater than said constant energy control level p in accordance with a density to be reproduced.

37. The half-tone image reproduction apparatus according to claim 34, wherein said Dither matrix memory stores said Dither matrix for use in one of the partial range which is constituted by a group of fixed elements fixed to at least two energy control levels p and P ($0<p<P\leq N$) and one variable element whose energy control level is changed between 0 and P in accordance with an input density level.

38. The half-tone image reproduction apparatus according to claim 34, wherein said Dither matrix memory stores said Dither matrix for use in one of the partial density ranges is constituted by a group of Q ($2\leq Q<M$) variable elements whose energy control levels are changed in accordance with an input density level.

39. The half-tone image reproduction apparatus according to claim 38, wherein said Dither matrix memory stores said Dither matrix including at least one element of a constant energy control level R ($0<R\leq N$) in a group of fixed elements other than said group of variable elements.

40. The half-tone image reproduction apparatus according to claim 34, wherein said Dither matrix memory stores said Dither matrix for use in one of the partial density ranges including an element whose energy control level is increased and an element whose energy control level is decreased with a change in input density level.

* * * * *